US012519914B2

(12) United States Patent
Routhier

(10) Patent No.: US 12,519,914 B2
(45) Date of Patent: Jan. 6, 2026

(54) VIEWER-ADJUSTED STEREOSCOPIC IMAGE DISPLAY FROM CAMERAS SHARING A COMMON PORTION OF THEIR FIELD OF VIEW

(71) Applicant: CUBICSPACE TECHNOLOGIES INC., Québec (CA)

(72) Inventor: Nicholas Routhier, Québec (CA)

(73) Assignee: CUBICSPACE TECHNOLOGIES INC., Québec (CA)

( * ) Notice: Subject to any disclaimer, the term of this patent is extended or adjusted under 35 U.S.C. 154(b) by 0 days.

(21) Appl. No.: 18/871,118

(22) PCT Filed: Jun. 1, 2023

(86) PCT No.: PCT/CA2023/050752
§ 371 (c)(1),
(2) Date: Dec. 2, 2024

(87) PCT Pub. No.: WO2023/230724
PCT Pub. Date: Dec. 7, 2023

(65) Prior Publication Data
US 2025/0350710 A1   Nov. 13, 2025

Related U.S. Application Data

(60) Provisional application No. 63/348,743, filed on Jun. 3, 2022.

(51) Int. Cl.
*H04N 13/111* (2018.01)
*H04N 13/204* (2018.01)
*H04N 13/344* (2018.01)

(52) U.S. Cl.
CPC ......... *H04N 13/111* (2018.05); *H04N 13/204* (2018.05); *H04N 13/344* (2018.05)

(58) Field of Classification Search
CPC ............... H04N 13/111; H04N 13/204; H04N 13/344
See application file for complete search history.

(56) References Cited

U.S. PATENT DOCUMENTS

2020/0177862 A1   6/2020   Routhier
2020/0211255 A1   7/2020   Elg et al.
(Continued)

OTHER PUBLICATIONS

International Search Report and Written Opinion for PCT/CA2023/050752, Mailed on Sep. 25, 2023, 8 pages.

*Primary Examiner* — Boubacar Abdou Tchoussou
(74) *Attorney, Agent, or Firm* — Procopio, Cory, Hargreaves & Savitch LLP

(57) ABSTRACT

The present disclosure relates to an image modification process used to generate a chosen type of stereoscopic video of the common field of view shared by two cameras without requiring any pre-set and arrangement normally needed for stereoscopic display. The process can use left and right video streams of images originating from a wide range of camera types sharing some portion of their respective fields of view that are not limited to a specific relative orientation (convergent, parallel or divergent) and can be used to adapt in real time the stereoscopic video to be displayed to a viewer where his dynamic inputs are constantly updated. The proposed method can be used to optimize, correct and or allow the use of various apparatuses (webcams, cameras, scanners, etc.) that may come out of the production lines with imperfects to the capture cameras.

22 Claims, 21 Drawing Sheets

(56) References Cited

U.S. PATENT DOCUMENTS

2020/0372710 A1 11/2020 Wang et al.
2021/0217239 A1 7/2021 Sinclair et al.
2021/0304498 A1 9/2021 Holger

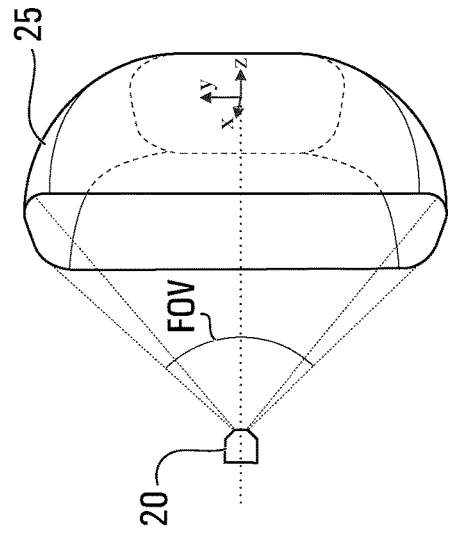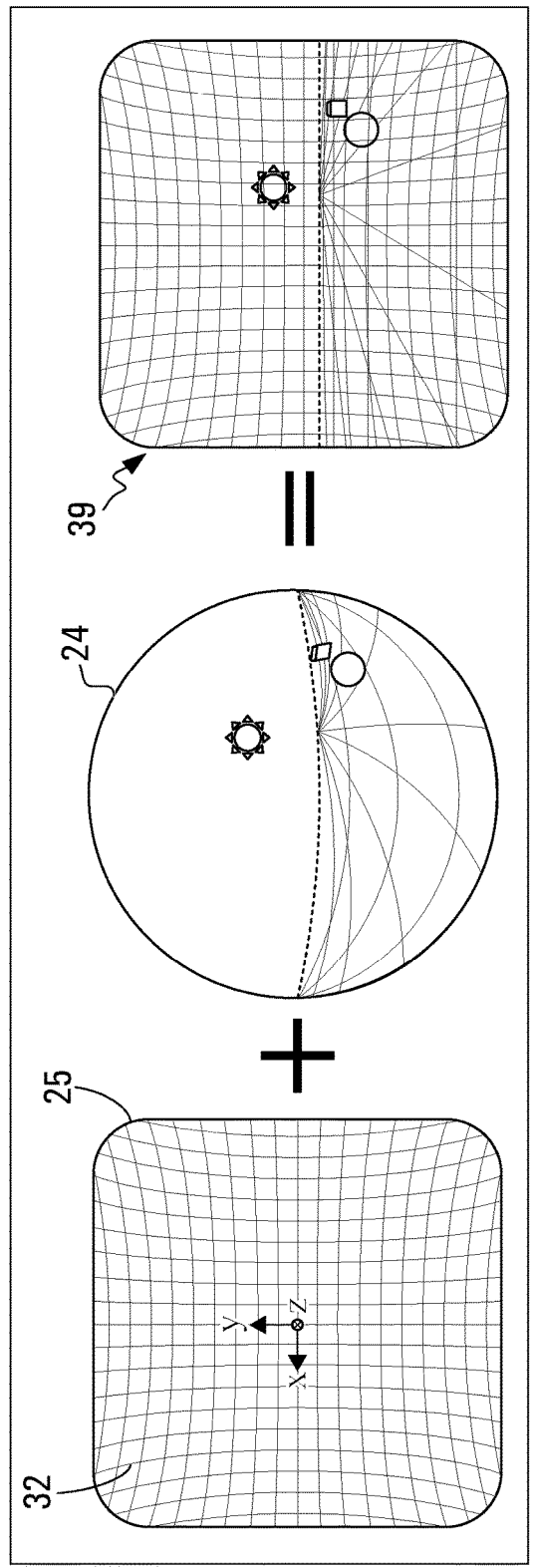
FIG. 3A
FIG. 3B
FIG. 3C

VIEWER-ADJUSTED STEREOSCOPIC IMAGE DISPLAY FROM CAMERAS SHARING A COMMON PORTION OF THEIR FIELD OF VIEW

CROSS-REFERENCES TO OTHER RELATED PATENT APPLICATIONS

This application claims priority from U.S. provisional patent application 63/348,743 filed Jun. 3, 2022, the content of which is hereby incorporated by reference.

TECHNICAL FIELD

This application relates to stereoscopic image display.

BACKGROUND

Conventional stereoscopic imaging involves the acquisition of left eye and right eye images with camera positions and orientations that correspond to the nominal viewing geometry, for example a person sitting in the middle of the cinema, to provide a comfortable 3D viewing experience. When a stereoscopic video that was acquired for a cinema is to be viewed in the home, the 3D experience is often unsatisfactory. The depths of objects may appear unnatural and cause strain or fatigue.

Alternative methods were previously presented to perform image processing to reformat and/or optimize stereoscopic images. Applicant has previously proposed a technique for adjusting stereoscopic images acquired from parallel cameras that have been demonstrated to reduce eye strain and to improve the 3D viewing experience, as described in U.S. Pat. No. 10,917,623. However, this technique imposes the limiting constraint on the capture cameras to be parallel.

SUMMARY

In this patent, the term "capture camera" is referring to the physical camera used to take an image or a video of a chosen scene in the real environment (i.e., not a virtual environment).

The present disclosure relates to an image modification process used to generate a chosen type of stereoscopic image and/or video of the common field of view shared by two capture cameras without requiring any setup or prearrangement normally needed for stereoscopic display. The process can use left and right video and/or image streams of images originating from a wide range of camera types sharing some portion of their respective fields of view that are not limited to a specific relative orientation (convergent, parallel or divergent) and can be used to adapt in real time the stereoscopic video to be displayed to a viewer where his dynamic inputs are constantly updated.

Applicant has discovered that the disparity of perspective of images sharing a common portion of their fields of view, due to the misalignment and/or non-optimal orientation of the capture cameras, can be overcome.

A method of processing images using a graphics processing unit (GPU) for stereoscopic display to a viewer, the images being captured by a left capture camera and a right capture camera having a common portion of capture fields of view, the method comprising: generating a left and a right polygon mesh using specifications of the left and right capture camera having a center axis and defining a position of the virtual camera relative to the mesh so as to correspond to a field of view of the capture camera; texturing the left and right polygon mesh with at least one image from the left and right capture cameras, respectively, to create a left and a right virtual 3D object respectively; and rendering a left eye and a right eye image using a left and a right virtual camera directed to capture at least a portion of the left and the right virtual 3D object respectively; wherein orientation parameters for the left and right virtual camera are defined as follows: (a) defining, in capture space, a reference line extending between a position of the left capture camera and a position of the right capture camera; (b) defining, in capture space, an orientation for the left virtual camera and the right virtual camera to have an orientation parallel to one another and in a selected viewing horizon plane; (c) determining left and right orientation offset vectors defining a change between the orientation for the left and right virtual cameras and an optical axis orientation of the left and right capture cameras corresponding to the center axis; (d) using the left and right orientation vectors to orient, in virtual space, about the center axis the left and right polygon meshes with respect to the left and right virtual cameras, respectively; and (e) defining frustum parameters for the left virtual camera and the right virtual camera using display parameters including display dimensions, a distance to a display, an interocular distance and a viewing direction.

In some embodiments, the display parameters include a magnification, wherein the frustum parameters are defined using the magnification.

In some embodiments, step (d) comprises defining a lens-shift parameter for the left and the right virtual cameras.

In some embodiments, the orientation of the optical axis of the left and right capture cameras are coplanar.

In some embodiments, the optical axis of the left and right capture cameras are parallel, wherein the left and right capture cameras have different fields of view, and wherein the reference line is non-perpendicular to at least one of the optical axis of the left or right capture camera.

In some embodiments, the raw images may be still images.

In some embodiments, the raw images may be video images.

In some embodiments, the left eye image and the right eye image are displayed to the viewer on a single screen of the stereoscopic display.

In some embodiments, the left eye image and the right eye image are generated as anaglyphic format images, as column interleaved format images for display on an autostereoscopic display, as a sequence of page-flip images for viewing with shutter glasses, or as a sequence of line-interleaved for polarized displays.

In some embodiments, the stereoscopic display comprising a left image display and a right image display, wherein the left eye images are displayed to a left eye of the viewer with the left image display and the right eye images are displayed to a right eye of the viewer with the left image display.

In some embodiments, the viewer comprises a plurality of viewers, and the interocular distance is selected to be a smallest interocular distance among the plurality of viewers.

In some embodiments, a relative orientation between the left capture camera and the right capture camera is diverging.

In some embodiments, a relative orientation between the left capture camera and the right capture camera is parallel.

In some embodiments, a relative orientation between the left capture camera and the right capture camera is converging.

In some embodiments, at least one of the left eye image and the right eye image have an aspect ratio different than an aspect ratio defined by the dimensions of the stereoscopic display, providing a border for the at least one of the left eye image and the right eye image for display to the viewer.

In some embodiments, the capture fields of view comprise a panoramic image, the method further comprising defining a chosen optical axis within a portion of the panoramic image comprised in the common portion of the capture fields of view, wherein the portion of the panoramic image and the chosen optical axis are to be processed with the method.

Another broad aspect is a device for processing stereoscopic images for display to a viewer, the device comprising the graphics processor unit, a central processor and a memory readable by the central processor, the memory storing instructions for performing the method as previously defined.

Another broad aspect is a computer program product comprising a non-transitory memory storing instructions for a processor connected to a GPU for performing the method as previously defined.

BRIEF DESCRIPTION OF THE DRAWINGS

The invention will be better understood by way of the following detailed description of embodiments of the invention with reference to the appended drawings, in which:

FIG. 3A is a top view of a diagram illustrating a scene featuring a sphere, a cube and the sun observed by a divergent wide-angle lens capture camera with a wide field of view.

FIG. 3B is a three-dimensional side view of a diagram illustrating the polygon mesh for a wide-angle lens capture camera.

FIG. 3C is a two-dimensional illustration of the front view of a virtual object resulting from the texturing of the polygon mesh of FIG. 3B corresponding to a wide-angle lens capture camera.

DETAILED DESCRIPTION

The image processing for stereoscopic display will be better understood by way of the following detailed description of embodiments with reference to the appended drawings.

The method described herein can be used to provide a 3D experience with a pair of rendered stereoscopic images that can be generated from images captured with capture cameras sharing a common portion of their fields of view that may not have been intended for stereoscopy and by displaying these final rendered stereoscopic images with the chosen stereoscopic technique (autostereoscopic, anaglyphic, line interleaved, column interleaved, etc.) and display apparatus.

The method can include, for each one of the capture cameras, generating a polygon mesh in a virtual environment in accordance with the distortion specifications of the type of lenses of the capture cameras (standard, wide angle, fisheye, etc.), the magnification, the positions and/or the orientations of the capture cameras.

In a virtual environment, the above-mentioned captured images can be used to texture the corresponding polygon mesh to produce virtual objects that can be in 3D (3D object). This virtual environment can allow to position a virtual object in a chosen position and orientation relatively to the corresponding virtual camera, or vice versa, according to the position specification of the capture cameras.

The virtual cameras can be used to capture selected portions of their respective virtual object (projection transformation). The final stereoscopic images can be displayed to the viewer after operations that may include clipping and rendering of the selected portions of the virtual objects.

These virtual cameras having a view frustum may be dimensioned with an aspect-ratio of the stereoscopic display aspect ratio of the stereoscopic display, the interocular distance of the viewer, any vergence-accommodation, his distance with the stereoscopic display and any magnification input selected by the viewer and any zoom selected by the viewer.

The lens-shift of the virtual cameras can be defined by the interocular distance of the viewer, his distance with the stereoscopic display, the dimensions of that stereoscopic display, any ocular convergence/accommodation compensation, any off-axis viewing angle of the viewer (region of interest of the viewer), or a combination thereof.

In some embodiments, the rendered images can be further processed in order to generate a pair of optimized final stereoscopic images with methods such as the ones disclosed in the U.S. Pat. No. 10,917,623 B2.

Figure 1A:
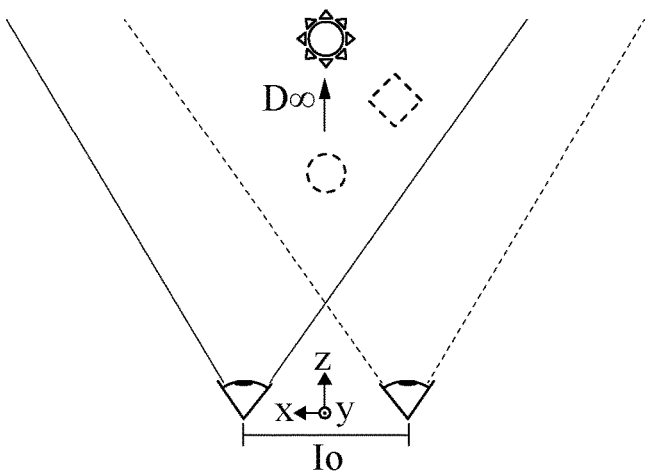
FIG. 1A is a top view of a diagram illustrating a scene observed by a viewer featuring a sphere, a cube and the sun.

FIG. 1A shows a schematic representation of the top view of a scene featuring a sphere sitting in the middle of the ground, the sun at infinity (D∞) in the middle of the sky and a cube placed to the right and slightly further than the sphere. The left and right eyes of an observer centered on the axis point of origin and the scene are also illustrated without any convergent orientation (parallels) as if the observer was looking at an object at infinity or, in this case, the sun.

Figure 1B:
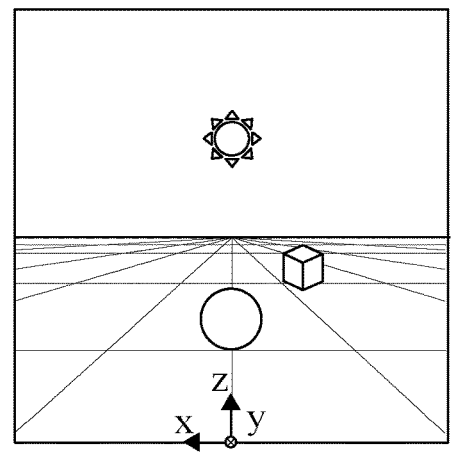
FIG. 1B is an illustration of an image of the scene captured from the axes point of origin.

FIG. 1B presents an illustration of the same scene as if captured with a camera placed on the point of origin, which helps to compare the following stereoscopic illustration to what can be considered as a passive visualization of the scene.

Figure 1C:
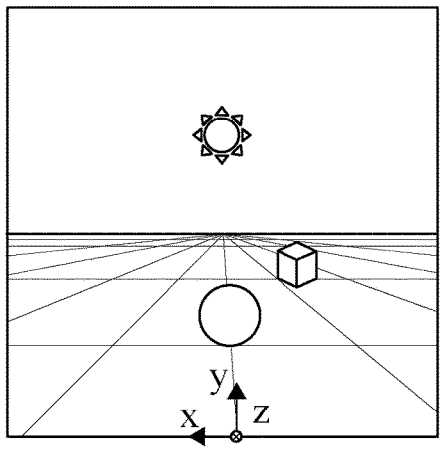
FIG. 1C is an illustration of the image of the scene as seen by the left eye of an observer in front of the axes point of origin.
Figure 1D:
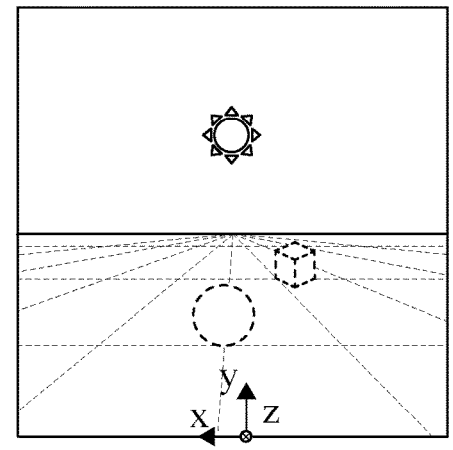
FIG. 1D is an illustration of the image of the scene as seen by the right eye of an observer in front of the axes point of origin.

FIGS. 1C and 1D illustrate the common region of the scene observed from the left and right eyes of the observer, respectively.

Figure 1E:
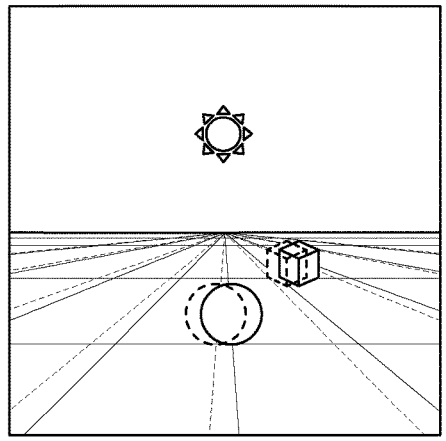
FIG. 1E is an illustration of the superposed images of the scene perceived by the left and right eyes so that the sun at infinity appears at the same position to better visualize the disparity between the left and right recaptured images.

FIG. 1E presents an illustration of a superposition of previous images of the scene as seen by the left eye (from FIG. 1C and here illustrated as faded) and the right eye (from FIG. 1D and here illustrated with dashed lines) of the observer. This superposition can be done so that the object on which the viewer may be focusing on (the sun) appears as a single object without any disparity, thus illustrating the various disparities of the other objects in the scene.

As someone skilled in the state of the art would point out, a restricted type and configuration of capture cameras are normally used to achieve a functional stereoscopic image with the common stereoscopic viewing techniques described in the prior art. For example, in order to generate the stereoscopic images analog to the anaglyphic representation of FIG. 1E with capture cameras, two identical capture cameras having lens arrangements specific to stereoscopic capturing/filming, which further requires to be precisely positioned and orientated with a very specific setup (e.g., viewer's eye of FIG. 1A), are usually required to obtain functional stereoscopic images of the scene. In fact, if these criteria are not strictly respected, the viewer can misperceive the depth and/or develop a negative physiological response.

However, the applicant has developed a technique of image processing allowing to generate functional stereoscopic images having a geometry correspondence (converging point of the viewer's eyes) between the reality and the stereoscopic display for using images captured with a wide range of capture camera types (standard, wide angle, fisheye, etc.) without needing a restricted preselected positioning as long as they share a common portion of their respective field of view.

In fact, as someone skilled in the art would point out, the type of capture cameras and their relative positioning may normally be specific to what would be considered to be an optimal stereoscopic imaging conditions or a functional correspondence. Some embodiments of the developed process can be used to generate a stereoscopic video that adapts to the viewer's perspective and dynamic parameters in real time or can speed up the computational process of some of the existing reformatting techniques of stereoscopic images.

Note that a "functional" stereoscopic image can here be defined as a stereoscopic image giving the right perception of depth, magnitude, scale, etc. without causing a significant negative physiological response from the viewer, such as dizziness, headaches, any uncomfortable feeling, etc.

Figure 2A:
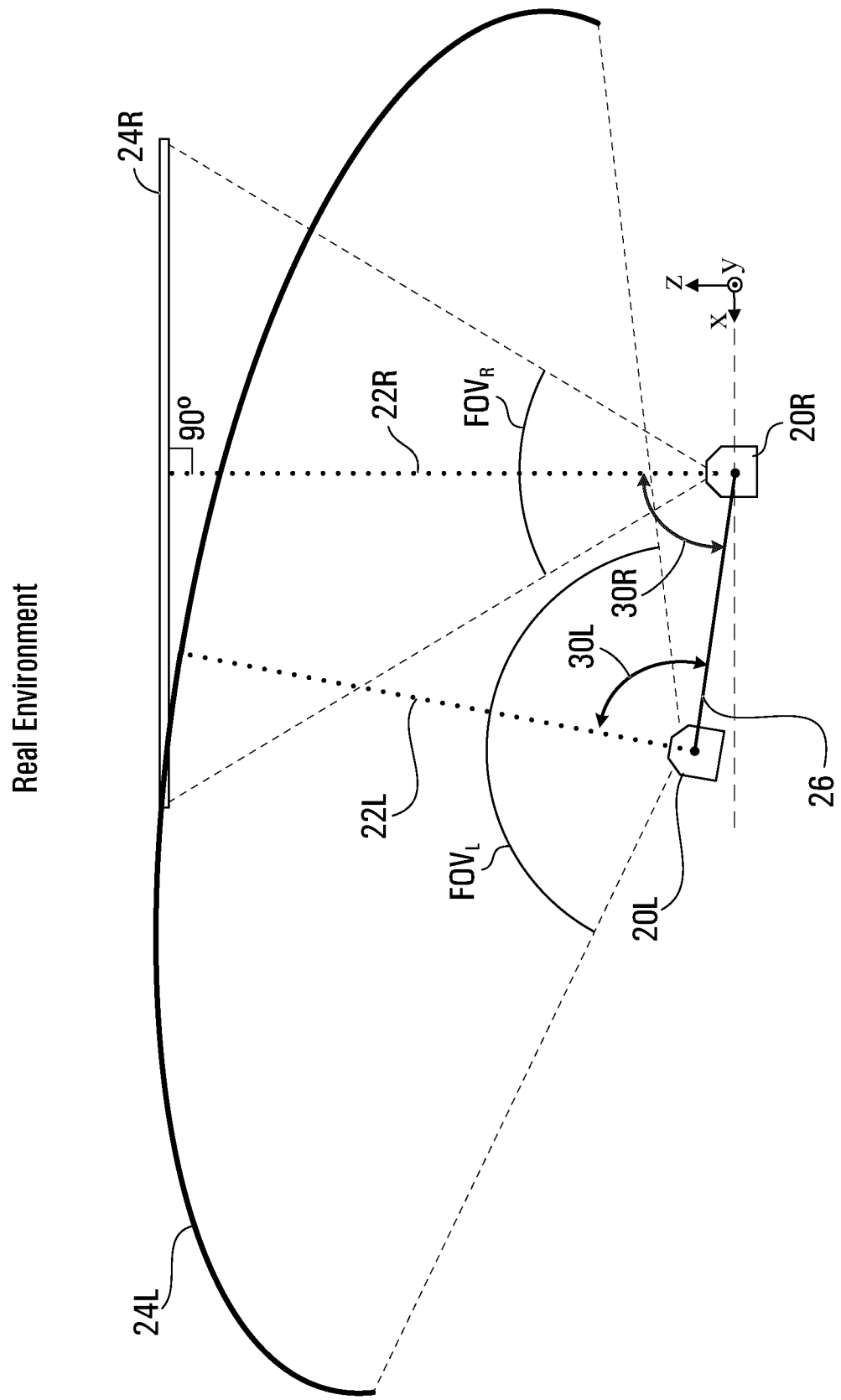
FIG. 2A is a schematic representation of a top view of two different capture cameras recording a common scene from different known orientations and positions.

The diagram of FIG. 2A illustrates a schematic representation of a top view of a wide-angle left capture camera 20L and a coplanar standard right capture camera 20R recording a common scene from different positions and from orientations that may be different. In the example of FIG. 2A, the right capture camera can be located on the x-axis and have an optical axis having an orientation 22R parallel to the z-axis.

The orientation and the distance of a relative reference axis 26 between the central point of the two capture cameras can be extracted from the static parameters of the capture cameras by using their relative tridimensional positions. A relative orientation 30L or 30R of the optical axis of the capture camera 22L or 22R relative to the relative reference axis 26 can be measured or calculated using the parameters of the capture camera. Some of these real environment characteristics including the relative orientations, the relative reference axis and others can then be used to position some of the elements comprised in the virtual environment(s).

Figure 2B:
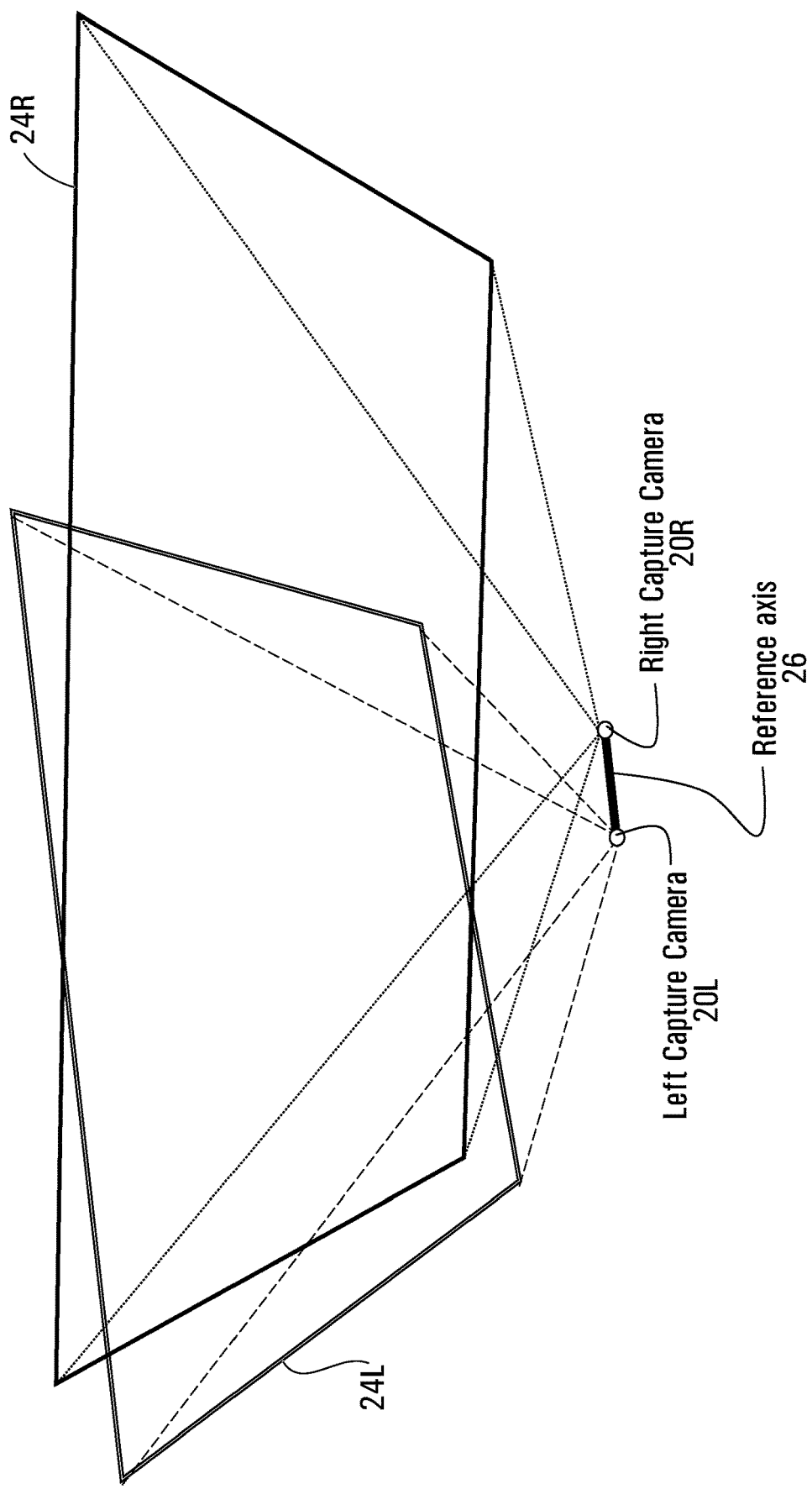
FIG. 2B is a schematic isometric view of the field of views of two capture cameras.

FIG. 2B shows an isometric view of two capture camera fields of view. As can be seen in this figure, the proposed method can allow for the use of a pair of various capture cameras that are not required to have similar types of lenses or fields of views. In this example, the left capture camera 20L has a field of view that can be narrower than the field of view of the right capture camera 20R.

Figure 2C:
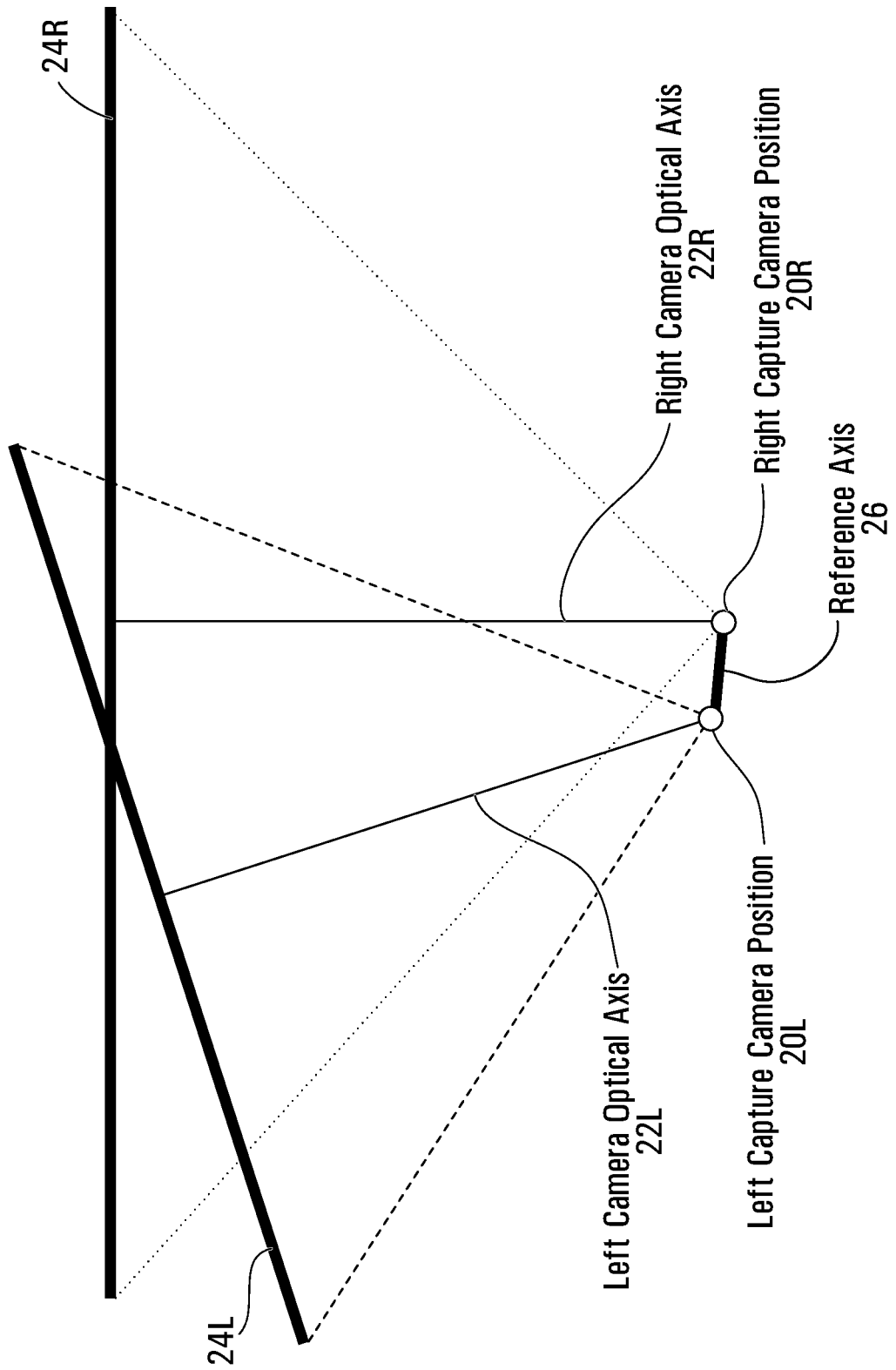
FIG. 2C is a schematic plan view of the field of view of the two capture cameras shown in FIG. 2B.

As illustrated in FIG. 2C, the optical axes 22L and 22R do not have to be parallel. The cameras 20 may even have a roll angle between them, meaning that the horizon captured may be at different angles in their images. The parameter data from the capture cameras 20L and 20R can be recorded from measurements done by the operator of the cameras, or it can be done by analysis of the images acquired from the capture cameras. The parameter data of the capture cameras (capture camera parameters) can include the specifications of the field of view angles and shape (e.g., rectangular, circular, oval) as well as the relative orientation and relative position between the capture cameras. It should be noted that the optical axes 22L and 22R need not be coplanar.

Note that a reference axis 26 is defined herein as the line passing through the capture camera positions 20L and 20R. In virtual space, the reference axis 26 can be used as a base axis to position the various virtual components (virtual cameras, meshes, 3D objects, etc.) relatively to it. In the preferred embodiments, the virtual cameras can be positioned in virtual so that the reference axis 26 passes through both virtual cameras.

As will be described below, a GPU can be used to process the capture camera images to provide images suitable for display to a viewer. In the case of parallel cameras having a common baseline, Applicant's PCT patent application publication WO2019/041035 published on 7 Mar. 2019 describes the use of a graphics processing unit (GPU) to perform image processing to provide images suitable for display to a viewer.

In a GPU, one way to process images may be to create a virtual surface or object, texture the object with the capture image, and then to render an image using a virtual camera that in effect performs the desired scaling, shifting and, optionally de-warping through the specifications of the virtual surface or object and the virtual camera parameters. Realtime video processing may be easy to perform using a GPU following this approach.

Figure 2D:
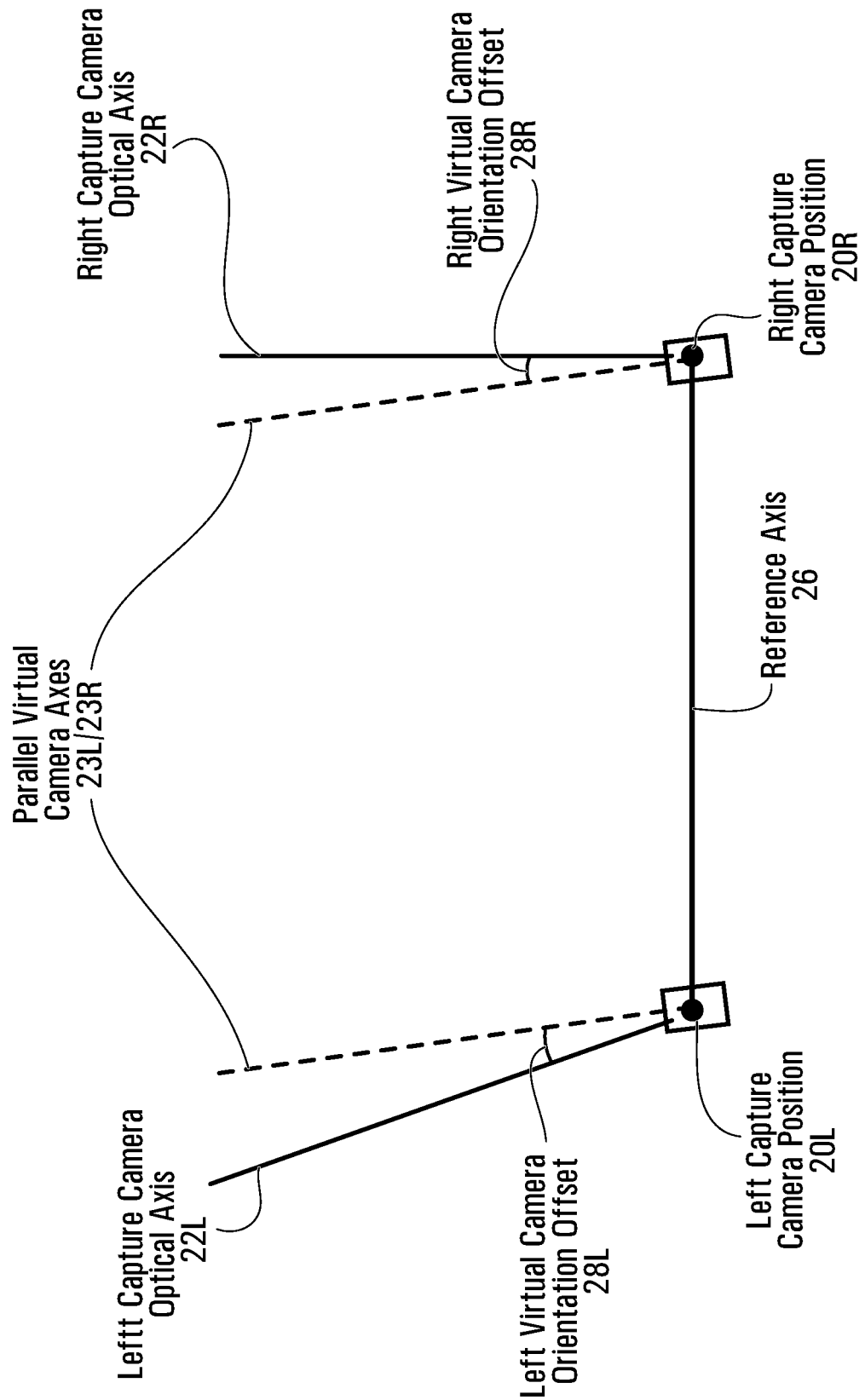
FIG. 2D is a schematic illustration of the placement of virtual cameras along the reference axis in the embodiment of FIG. 2C within the capture space frame of reference with offsets with respect to the capture cameras.

In the present application, the technique can be extended to cameras whose capture properties are not restricted in terms of their capture orientation. The problem of this restriction can be resolved by defining, in capture space, the reference axis 26 and to define the positions of the virtual cameras as being on the reference axis 26 at the locations of the center axes of the capture cameras and having virtual camera axes parallel to one another, as also illustrated in FIG. 2C. The direction of the virtual cameras, namely the right-left angle and the up-down angle is the direction of viewing. The spacing between the virtual cameras 21 can correspond to an interocular distance of the viewer. This is illustrated in FIG. 2D and a more detailed description of the angular orientation offset is described below with reference to FIG. 2J.

Figures 2E, 2F:
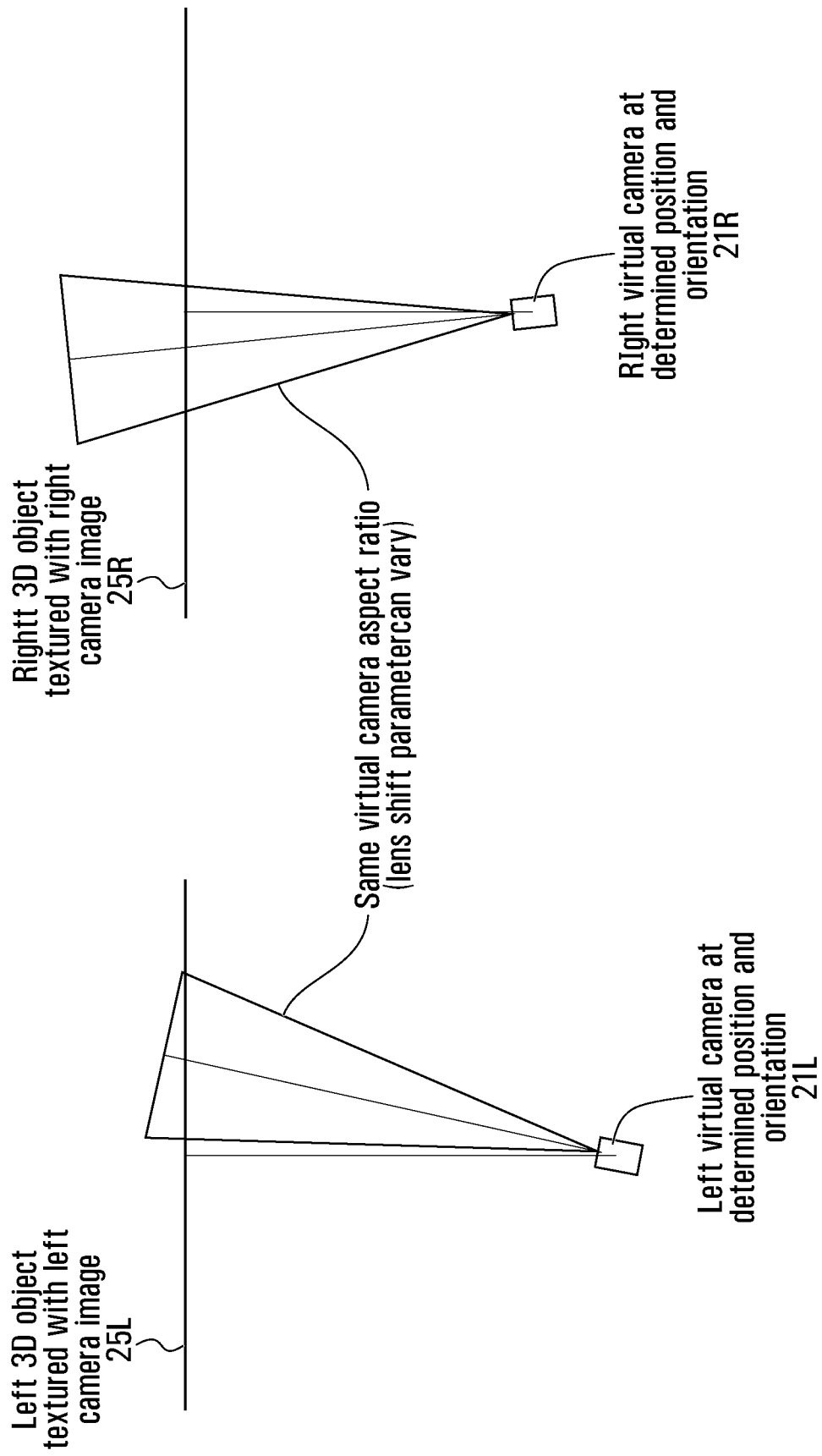
FIG. 2E is a schematic plan view of the placement of a left virtual camera in virtual space with an orientation and position defined by the offsets defined in FIG. 2D.
FIG. 2F is a schematic plan view of the placement of a right virtual camera in virtual space with an orientation and position defined by the offsets defined in FIG. 2D.

FIGS. 2E and 2F schematically illustrate how the virtual cameras 21L and 21R can be positioned with respect to their respective 3D surfaces or objects 25. While the 3D objects 25L and 25R are illustrated as being planar 3D surfaces, it will be appreciated that camera optics can lead to images that are not uniform and the corresponding 3D objects 25 may not be planar, as is described below with reference to FIGS. 3B and 4A.

As shown in FIGS. 2E and 2F, in virtual space, the 3D object 25 textured with the source capture camera image can be positioned at a predetermined location. The GPU virtual camera can be used as a tool to extract images for display that collects a view of a portion of the 3D object 25. Additionally, many GPUs support a "lens shift" parameter for defining the properties of a virtual camera 21. Lens shift can be a parameter that results in the camera frustum becoming oblique (i.e., asymmetric). For example, lens shift can shift the lens horizontally or vertically from the center. Values for lens shift can be multiples of the sensor size, for example, a shift of 0.5 along the X axis offsets the sensor by half its horizontal size.

Figure 2G:
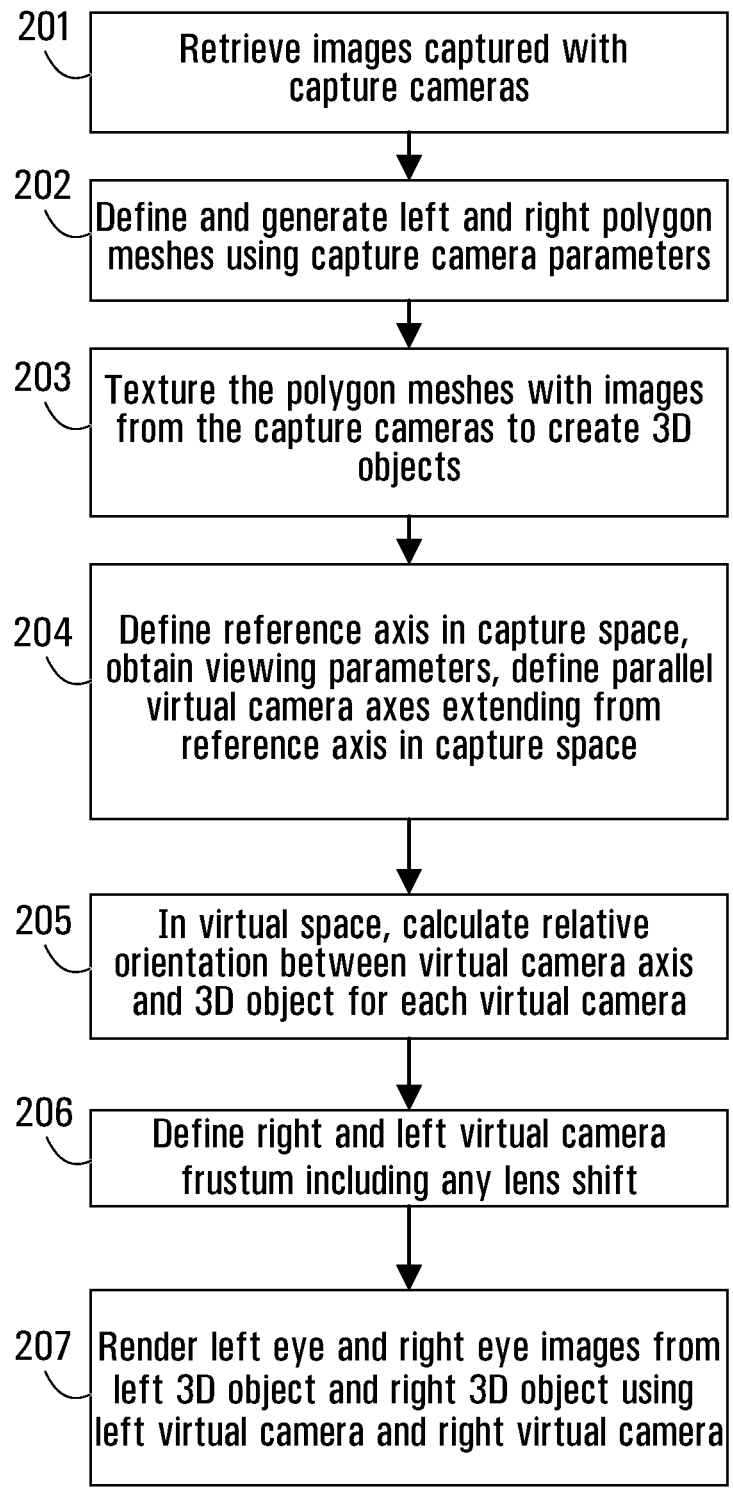
FIG. 2G is a flow diagram illustrating the steps involved in the embodiment of FIGS. 2B to 2F.

The process of some of the present embodiments is illustrated FIG. 2G, which can include a step 201 where the capture camera parameters can be retrieved; a step 202 where the 3D objects 25 can be determined from the capture camera parameters and can be established in the GPU; a step 203 where the source images can be loaded into the GPU and the GPU textures the objects 25 with the respective source images, a step 204 where the reference axis 26, which can be a given as part of the parameters of the capture cameras or can be previously determined in capture space based on the capture camera parameters (e.g., locations of the capture cameras in 3D space), can be retrieved and used in virtual space.

The viewer's parameters can include the distance to the display (i.e., viewer-to-screen distance), the display dimensions, the interocular distance and/or the viewing orientation of the viewer, which may be provided or measured.

In some embodiments, step 204 can utilize the viewer's parameters and/or the capture camera parameters to arrange/position the virtual cameras 20 on (e.g., at each extremity) of the reference axis 26 and/or can be used to determine/arrange the orientation of the parallel virtual camera axes 23 which can be extending in a same direction from the reference axis 26. This can allow for orienting the optical axis of the virtual camera 23 in virtual space.

In some embodiments, a step 205 can be used to calculate the relative orientation between the virtual camera axes 23 and their respective 3D object (i.e., the 3D mesh that is textured with the captured image/texture).

In some embodiments, a step 206 can be used to determine or calculate the frustum and/or the lens shift of each of the virtual camera's field of view, which can be done using the viewer's parameters and/or the capture camera parameters.

In some embodiments, a step 207 can be used where the parameters of the virtual cameras 21 can be passed to the GPU that can then process the rendering of the left eye and right eye images for the viewer that can then be displayed with various methods and apparatuses to the viewer through a display screen.

Figure 2H:
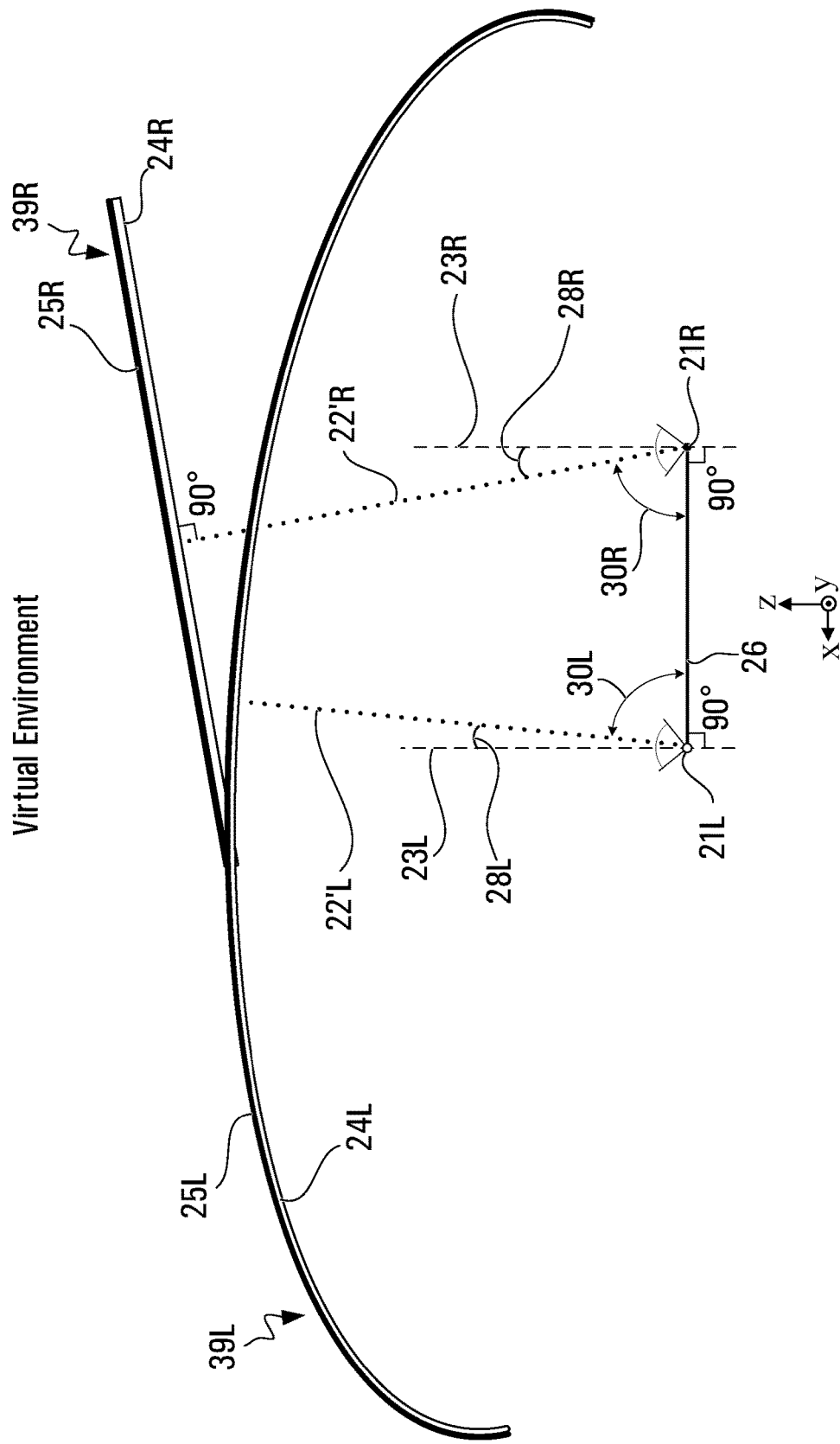
FIG. 2H schematic representation of a top view of a virtual environment with generated virtual objects and two similar virtual cameras positioned parallel to each other, at a relative position equivalent to the position of their corresponding capture camera and at a specific known distance to one another to recapture stereoscopic images while conserving the geometry correspondence of the capture cameras.

As illustrated in the exemplary embodiment of FIG. 2H, a left virtual camera 21L, a right virtual camera 21R and the polygon meshes 25 (geometry) can be positioned using some of the real environment characteristics. It will be appreciated that calculating the orientation previously mentioned can be analogous to a simple change of coordinate system.

For example, in the embodiment of FIG. 2H each of the virtual cameras 21L/21R can be fixed at each corresponding extremity of the relative reference axis 26 to position and orient these virtual cameras. In some embodiments, the distance between both virtual cameras 21L/21R can be positioned to have the same relative distance between the real distance between the capture cameras 20L/20R.

Most importantly, the virtual cameras 21L/21R can be given an optical axis 23L/23R having an orientation that is perpendicular to the relative reference axis 26 and where they can be parallel to each other. Their respective polygon mesh (25L for the left camera and 25R for the right camera) can be positioned along a virtual object axis 22', an axis equivalent to the optical axis of the capture camera 22, that can be orientated with an equivalent relative orientation 30 (30L for the left virtual camera 21L and 30R for the right virtual camera 21R) with the relative reference axis 26.

It will be appreciated that all these requirements can be integrated in or translated by a virtual orientation vector 28 (28L for the left virtual camera 21L and 28R for the right virtual camera 21R) between the optical axis 23 of the virtual camera 21L/21R direction of the virtual object 22' (equivalent to the optical axis of the capture camera 22L/22R), which can be an orientation equivalent to the difference between an orientation of an optical axis 23 of the virtual camera relative to the relative reference axis and an orientation relative orientation 30.

Therefore, in some embodiments, the virtual camera can be orientated at a virtual orientation vector 28 from an orientation (direction) of the virtual object, or analogously, the orientation (direction) of the virtual object can be orientated at a virtual orientation 28 from the virtual camera.

In some embodiments, the distance between the virtual camera 21 and its corresponding mesh 25 may be adjusted, along the virtual object axis and using some of the parameters of the corresponding capture camera, to consider a distance between the viewer and the stereoscopic display (e.g., display screen) or its equivalent.

Figure 2I:
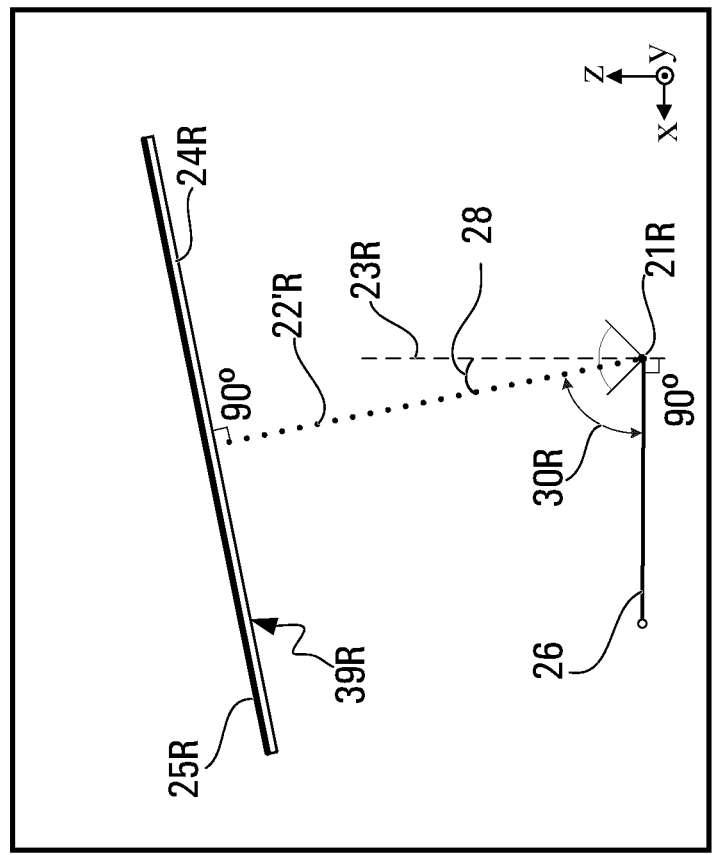
FIG. 2I schematic representation of a top view of an alternative embodiment where two virtual environments, each with a generated virtual object and similar virtual camera that is set to be virtually parallel to the virtual camera of the other virtual environment.
Figure 2I:
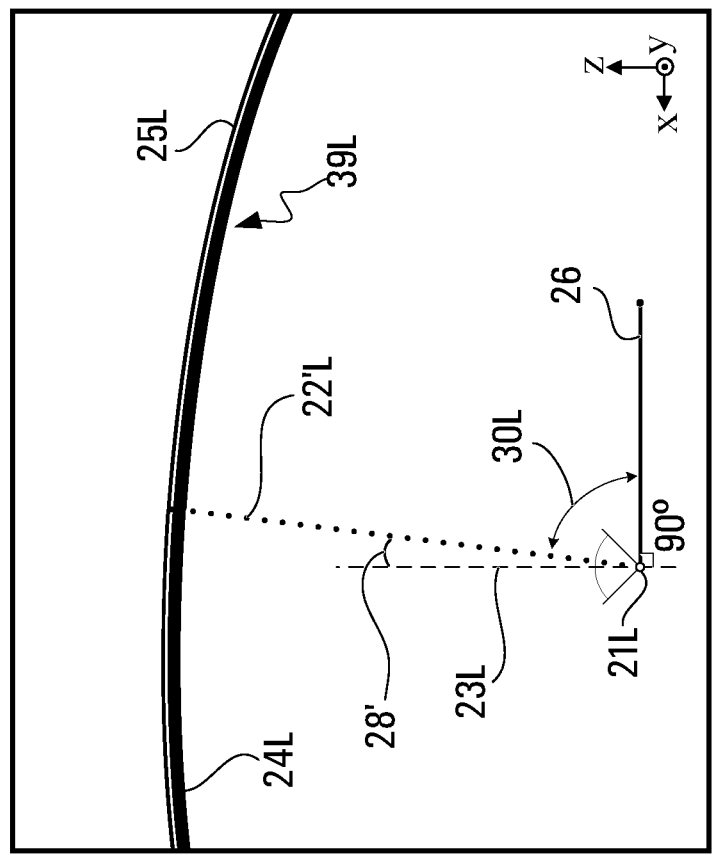

Someone skilled in the art would appreciate that, in the case of the schematic example of FIG. 2H, the raw imaged captured by the capture cameras, here referred to as a texture 24, to texture their respective polygon mesh would only be seen from their respective virtual camera. In other words, in order to prevent the texture and the mesh of one of the cameras from obstructing the field of view of the other one of the cameras, the left virtual camera 21L may only perceive the 3D object 39L (i.e., the left 3D mesh 25L textured with the image/texture 24L) and of the left capture camera 20L while the right virtual camera 21R may only perceive the 3D object 39R (i.e., the right 3D mesh 25R textured with the right image/texture 24R) of the right capture camera 20R, as if they were in alternate virtual environments as illustrated in FIG. 2I.

In some embodiments, the virtual camera 21L/21R can be positioned relatively to the corresponding polygon mesh 25L/25R, or vice versa, using the specifications of the capture cameras 20L/20R, to ensure a geometric correspondence between the real and virtual environment (i.e., virtual camera having a position equivalent to the position of the corresponding capture camera in the virtual environment).

In some embodiments, to ensure such a geometric correspondence, the virtual camera 21L/21R can be positioned on an axis equivalent to the optical axis of the capture camera (e.g., an axis perpendicular to the center of the polygon mesh), which may be extracted or calculated using the specifications of the capture cameras.

In some embodiments, to ensure such a geometric correspondence, the virtual camera 21L/21R can be positioned at a distance from the polygon mesh 25L/25R so that, when facing the polygon mesh from this distance, a virtual camera having a field of view equivalent (i.e., having the same angular dimensions, which can be extracted or calculated using the specifications of the capture cameras) to the field of view of the corresponding capture camera 20L/20R can see exactly (i.e., no more and no less than) the entirety of the polygon mesh (i.e., so that the perimeter of this field of view exactly coincides with the edge or perimeter of the polygon mesh).

Figure 2J:
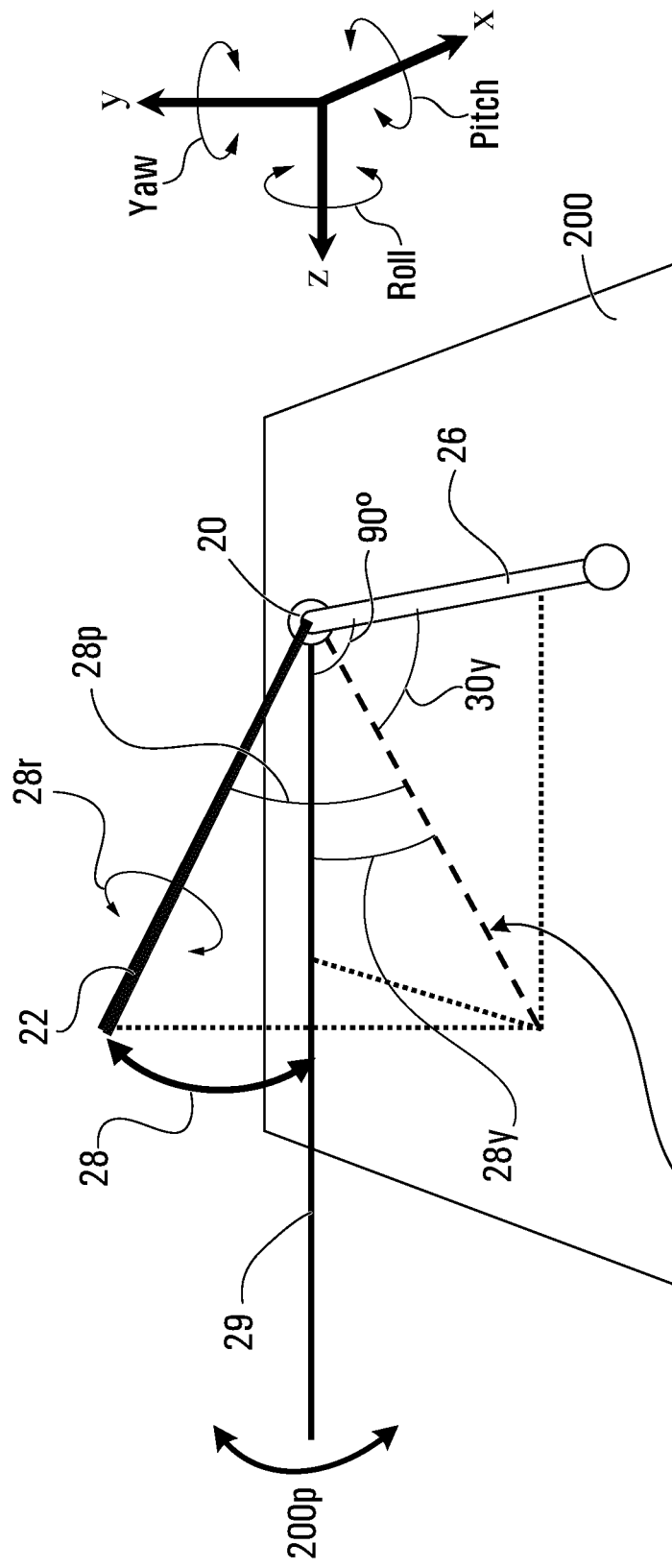
FIG. 2J presents a three-dimensional schematic representation of a virtual environment with an exemplary arrangement of some of the various elements (base axis, virtual camera, optical axis, etc.) of the virtual environment to ensure that a geometry correspondence with the real environment is conserved.

FIG. 2J presents a three-dimensional schematic representation of various elements used to calculate the virtual orientation vector 28 for each one of the left and right capture cameras which can be used, as previously presented, to ensure a geometry correspondence with the real environment in the virtual environment. The schematized embodiment presents a representation of relative reference axis 26 (extending between the two capture cameras 20L/20R), a base axis 29 perpendicular to the relative reference axis 26, and an optical axis 22 of the capture camera 20. As previously explained, the characteristics (e.g., position and orientation) of some of these elements can be extracted or calculated with or derived from the static parameters of the capture cameras (part of the capture camera parameters) by using their relative tridimensional positions and the relative orientation of the optical axis of the capture cameras.

In some embodiments, a base axis 29 can be defined to have chosen pitch associated to a pitch component 200$p$ of a viewing horizon 200 and having a yaw perpendicular to a relative reference axis 26. The relative reference axis 26 can have an orientation of a line between the central point of the two capture cameras calculated with the static parameters (relative three-dimensional positions) of the capture cameras. In some embodiments, the static parameters (specifications) of the capture cameras can be used to calculate a virtual orientation 28 (orientation between the base axis 29 and an optical axis 23 of the virtual camera).

In some embodiments, the components (roll 28$r$, pitch 28$p$ or yaw 28$y$) of the virtual orientation 28 illustrated in FIG. 2J can be calculated. In some embodiments, the pitch component 28$p$ (pitch orientation) of the virtual orientation 28 can correspond to the difference of pitch between the optical axes (any pitch of the capture camera 20) relative to the base axis 29.

It will be appreciated that, in some embodiment, the pitch of the virtual orientation 28$p$ can be alternately calculated with the following, $28p=|29p-30p|$, when the base axis 29 can have a pitch 29$p$ from a reference coordinate system of the static parameters used, for example, to determine a pitch of the virtual camera 30$p$.

In some embodiments, the yaw component (yaw orientation) of the virtual orientation 28y can correspond to the difference of yaw between the optical axis 22 and the base axis 29, which may intern be calculated using of the yaw between 30y between the optical axis 22 and the relative reference axis 26 with the following, $28y=|90°-30y|$.

In some embodiments, the roll component (roll orientation) of the virtual orientation 28r that can correspond to the roll between the virtual object and the virtual camera can be equivalent to the roll difference 28r between the capture camera and the viewing horizon 200.

In some embodiments, the base axis 29 can be coplanar with the optical axis 22 so that the pitch component of the virtual axis 28p is zero. In some embodiments, the viewing orientation of the viewer can be used to directly define the pitch 200p of the viewing horizon 200.

In some embodiment the viewing orientation of the viewer can be used to directly define the pitch of the base axis 29. In some embodiments, the pitch component of the viewing orientation of the viewer (looking up or looking down) can be used to define the pitch component of the viewing horizon 200p or the pitch component of the base axis.

It will be appreciated that someone skilled in the art can calculate and characterize the virtual orientation 28 with alternative calculations, equations, coordinate systems, etc.

FIG. 3A shows a schematic representation of the top view of the scene illustrated in FIG. 1A, but in this embodiment, an exemplary divergent wide-angle lens capture camera 20 can be used to capture the scene.

FIG. 3B shows a side view of a schematic 3D representation of the geometric representation of the field of view of this exemplary divergent wide-angle lens capture camera 20. This geometric representation may be analogous to the geometry 25, also known in the art as a polygon mesh, generated for correcting images captured with a wide-angle lens capture camera used in the embodiment illustrated in FIG. 3A.

FIG. 3C illustrates a 2D representation of the polygon mesh 25 with deformation grid pattern (mesh) 32 of the capture camera's lens from a front view. In this embodiment, the 3D object 39 (virtual image) can result from texturing the polygon mesh (geometry) 25 with a texture 24 (raw captured image) for a wide-angle lens capture camera. A person skilled in the art will appreciate that this embodiment's process is not limited to any capture camera type (standard, wide angle, fisheye, etc.) and that the virtual 3D object can be generated for any of them.

In a virtual environment, the field of view of a virtual camera or cone of vision is normally referred to as the view frustum, which can be defined by two parameters; an aspect ratio and angular dimensions (field of view having an aspect ratio corresponding or respecting the aspect ratio of the display screen). While the aspect ratio of the view frustum can be adjusted in accordance with the view port's aspect ratio (height and width of the corresponding display screen), the angular dimensions (field of view) of the view frustum can be adjusted according to the interocular distance of the viewer, any ocular convergence/accommodation compensation, his distance with the stereoscopic display, any magnification (zoom) input selected by the viewer, or a combination thereof.

In some embodiments, the interocular distance can be chosen to be or fixed at a given value (e.g., an average interocular distance of an adult or of a child). In some embodiments, a plurality of viewers can be considered and the interocular distance can be selected to be the smallest interocular distance among the plurality of viewers.

Figure 4B:
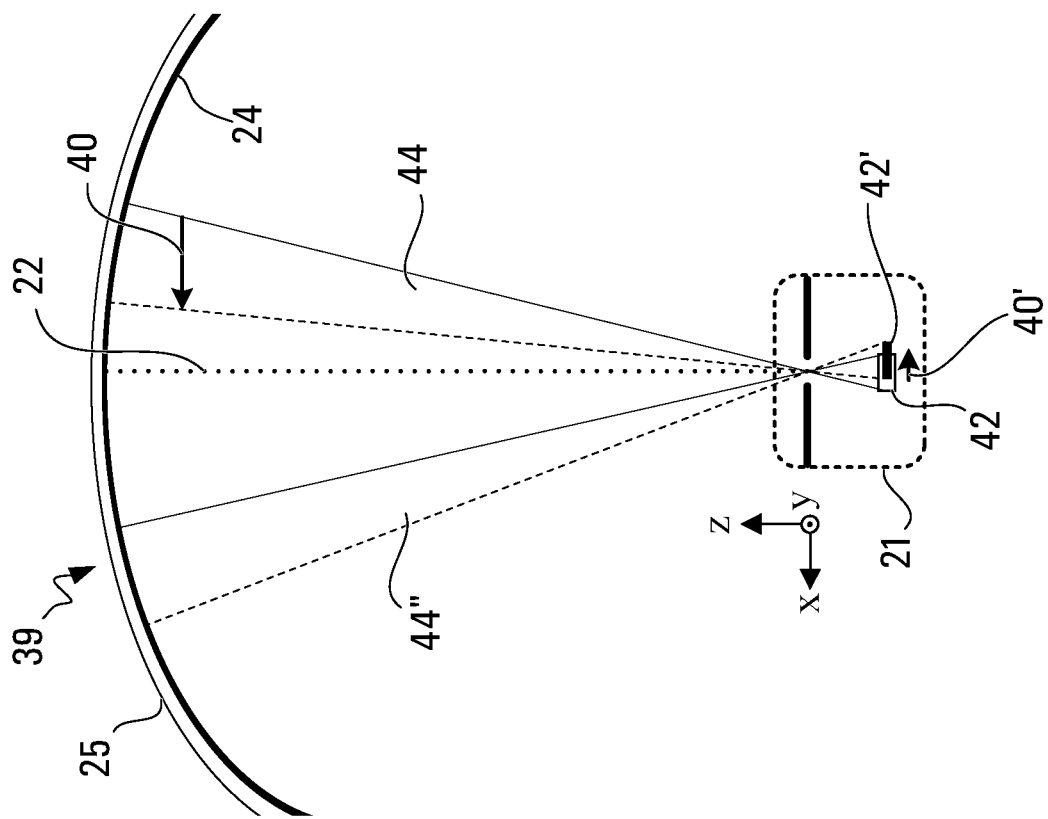
FIG. 4B is an illustrates a top view of a diagram of the camera transformation step where the field of view of the left virtual camera may be shifted with an image sensor translation.
Figure 4A:
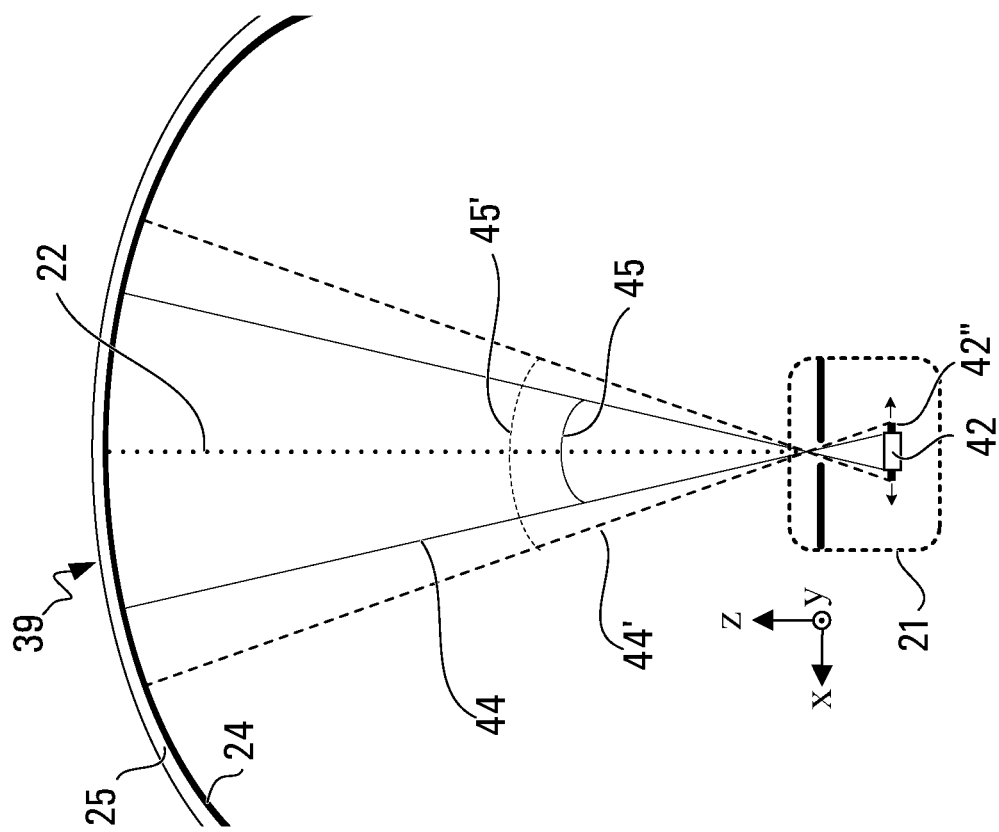
FIG. 4A is a top view of a diagram of the camera transformation step where the angular dimensions of the view frustum of a virtual camera may be adjusted.

FIGS. 4A and 4B are schematic top views illustrating an example of the view transformation steps of the applicant's method in a virtual environment, where a cross section of a virtual object 39 (polygon mesh 25 textured with an image 24 of a capture camera 20) can be selected (i.e., captured) using a virtual camera 21 (within its view frustum 44). In accordance with some embodiments, one of the view transformations that can be applied to adjust and modify a field of view of a virtual camera (view frustum 44) to respect the relevant dynamic parameters such as any zoom selected by the viewer, an aspect ratio and/or a resolution of the display screen, the interocular distance of the user and its distance with the stereoscopic display.

FIG. 4A presents an exemplary embodiment that illustrates such a change of dimension of a view frustum 44, where an angular dimension of the width 45 (horizontal field of view) of the frustum can be adjusted to be a larger width 45' and therefore have a larger view frustum 44', which may result from or be equivalent to a horizontal change of dimension (i.e., enlargement) of the image sensor 42 to a re-dimensioned image sensor 42".

In accordance with some embodiments, one of the view transformations that can be applied to adjust and modify a symmetry of the geometry of the view frustum 44 to make it oblique (asymmetric). Such a view transformation can be referred to in the art as a lens-shift of the virtual camera 21 that can be analogous to a sideways translation. A lens-shift 40, as illustrated in the exemplary embodiment of FIG. 4B, may comprise a translation 40' of the image sensor 42 of a virtual camera 21 to an alternative position (see 42') which results in the shifting (translation) of the viewing frustum 44, resulting in an asymmetric view frustum 44". It will be appreciated that a lens-shift may not induce any change on the optical axis 22 of the virtual camera 21 as illustrated in FIG. 4B, where it can be the same for both view frustum 44 and 44".

A lens-shift operation, well known in the art, is commonly used with virtual cameras, for example, it can be used to "shift the lens along either axis to make the camera view frustum oblique" in the 3D development platform Unity.

The selected lens-shift can be defined by the interocular distance of the viewer, his distance with the stereoscopic display, the dimensions of that stereoscopic display, any ocular convergence/accommodation compensation, any off-axis viewing angle of the viewer (region of interest of the viewer), or a combination thereof. In some embodiments, a lens-shift can be applied to adjust a wide variety of the aspects of the stereoscopic images, including but not limited to centering infinity on the 3D object, corresponding to the infinity of the captured image, and/or ensuring a correspondence between the real and virtual environments.

Figure 4C:
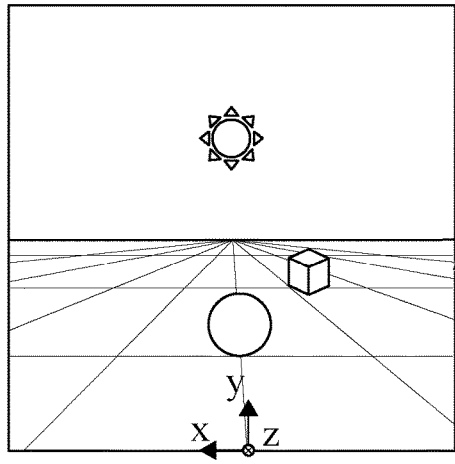
FIG. 4C is an illustration of the rendered left final image captured with the virtual camera of the left virtual environment to be displayed to the viewer's left eye.
Figure 4D:
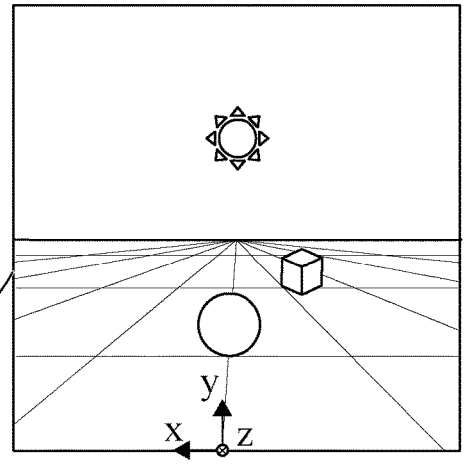
FIG. 4D is an illustration of the rendered right final image captured with the virtual camera of the right virtual environment to be displayed to the viewer's right eye.

When the required view transformations completed, the virtual camera 21 can capture the virtual image within the viewport (projection of the viewing frustum 44 onto the virtual object) by rendering the pixel within this region of interest, also referred to as clipping. This can allow for the rendering of functional stereoscopic images for the left and right eye of the viewer like the ones illustrated in FIGS. 4C and 4D respectively. In some embodiments, these recaptured images can be further processed with simple operations and techniques of image adjustment before displaying to the viewer with the chosen apparatus. Which, in some embodiment, may be similar to the method described by U.S. Pat. No. 10,917,623 B2.

Figure 4E:
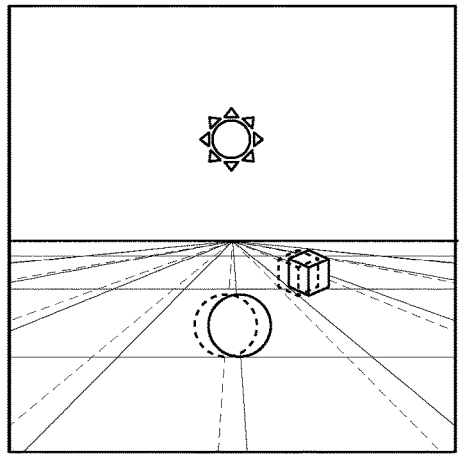
FIG. 4E is an anaglyph illustration of the superposition of the left and right final images so that the sun at infinity appears at the same position, allowing for the visualization of the disparity between the other objects.

In order to better visualize the disparities between these two images, FIG. 4E presents an illustration of a superposition of the previous left (same as FIG. 4C and here appearing as faded) and right (same as FIG. 4D and here illustrated with dashed lines) final stereoscopic images (rendered recaptured images 62) positioned so that the sun appears as a single object without any disparity. These left and right recaptured images 62 ($62_{Left}$ for the left virtual camera 21L and $62_{Right}$ for the right virtual camera 21R) can allow for an optimized three-dimensional (3D) perspective of the scene if displayed to the corresponding eyes of the viewer with a separation between them equivalent to the interocular distance of the viewer with respect to his distance with the display.

Figure 4F:
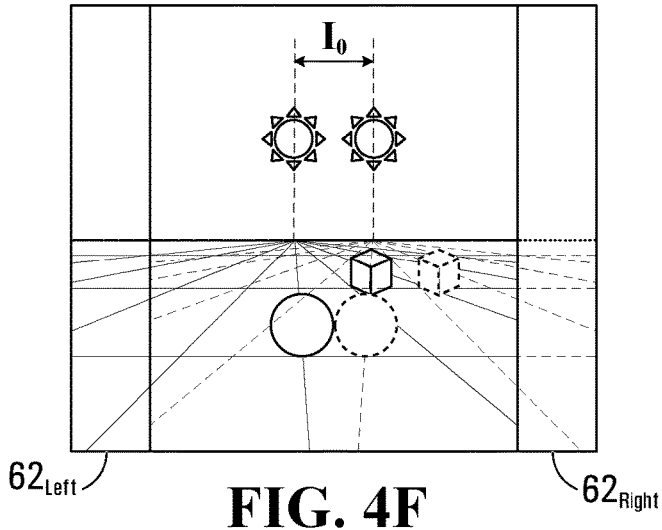
FIG. 4F is an anaglyph illustration of the superposition of the left and right final images having a sideways offset of an interocular distance (Io) of the viewer as it can be displayed on the display screen.

FIG. 4F illustrates an anaglyph illustration of the superposition of the left and right recaptured images 62 having such a sideways offset of an interocular distance (Io) of the viewer as it can be displayed on the display screen.

Figure 4G:
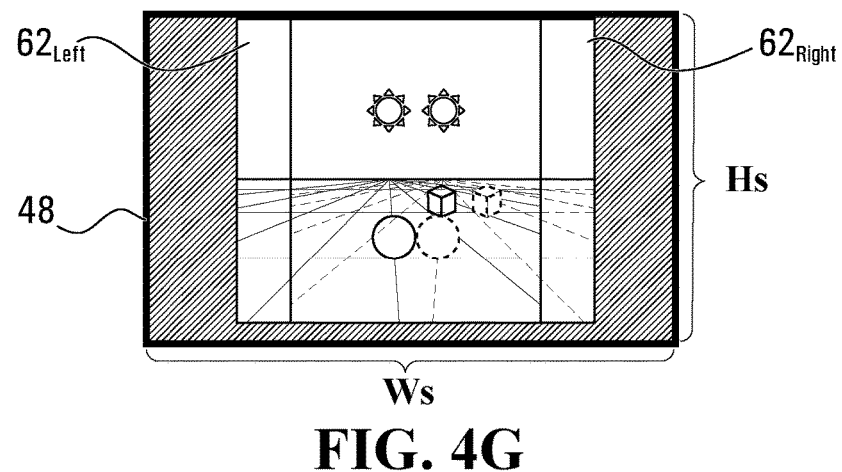
FIG. 4G is an illustration of an exemplary rendered final image having common portion smaller or with a different aspect ratio than the display screen where a region (frame of the border) of the images displayed outside of the common region may be presented as a neutral pixel.

FIG. 4G presents an exemplary embodiment where a pair of final stereoscopic images 62 having a common region smaller or with a different aspect ratio than the display screen 48 where a region of the images displayed outside of the common region, corresponding to the hatched region of the display screen in FIG. 4G, may be left out of the rendering process or displayed as neutral pixels (white, black, gray scale, an alternative chosen uniform color, a chosen color gradient, etc.) while the dimensions of the recaptured images 62 can remain unchanged.

The described methods of the presented embodiments innovate by creating a virtual environment for recapturing the captured images using parallel virtual cameras, which can be used to ensure geometric correspondence between the capture mode and the generated functional stereoscopic images of a portion of the common field of view of the capture cameras.

In some embodiments, the distortions that can be associated with the lenses of a capture camera may be corrected and nullified with a geometry generated and used to create the virtual 3D object in a virtual environment. This can allow to efficiently and rapidly recapture the images with parallel virtual cameras that may be dynamically updated to optimize their view frustum and optimize the geometric correspondence between the capture environment and the image for stereoscopic display and, when required, correct the lenses and perspective distortions in the process. A person skilled in the art will appreciate that this embodiment's process is not limited to any capture camera type and that the rendition mode (rendering process) can be adjusted to produce various stereoscopic display outputs.

This integrated recapturing method using parallel virtual cameras with fixed positions is one of the key aspects of the applicant's method of image processing that allows it to use a wide range of capture camera types and arrangements without requiring them to be preset specifically for stereoscopic purposes and to correct for potential deviations between their relative positions. In some embodiments, the processing load can be reduced by pre-generating the virtual image 39 (geometry textured with raw captured images in the virtual environment) and saving it to later be re-uploaded and used to rapidly produce stereoscopic images and update in real time with novel or updated viewer's dynamic parameters.

Figure 5A:
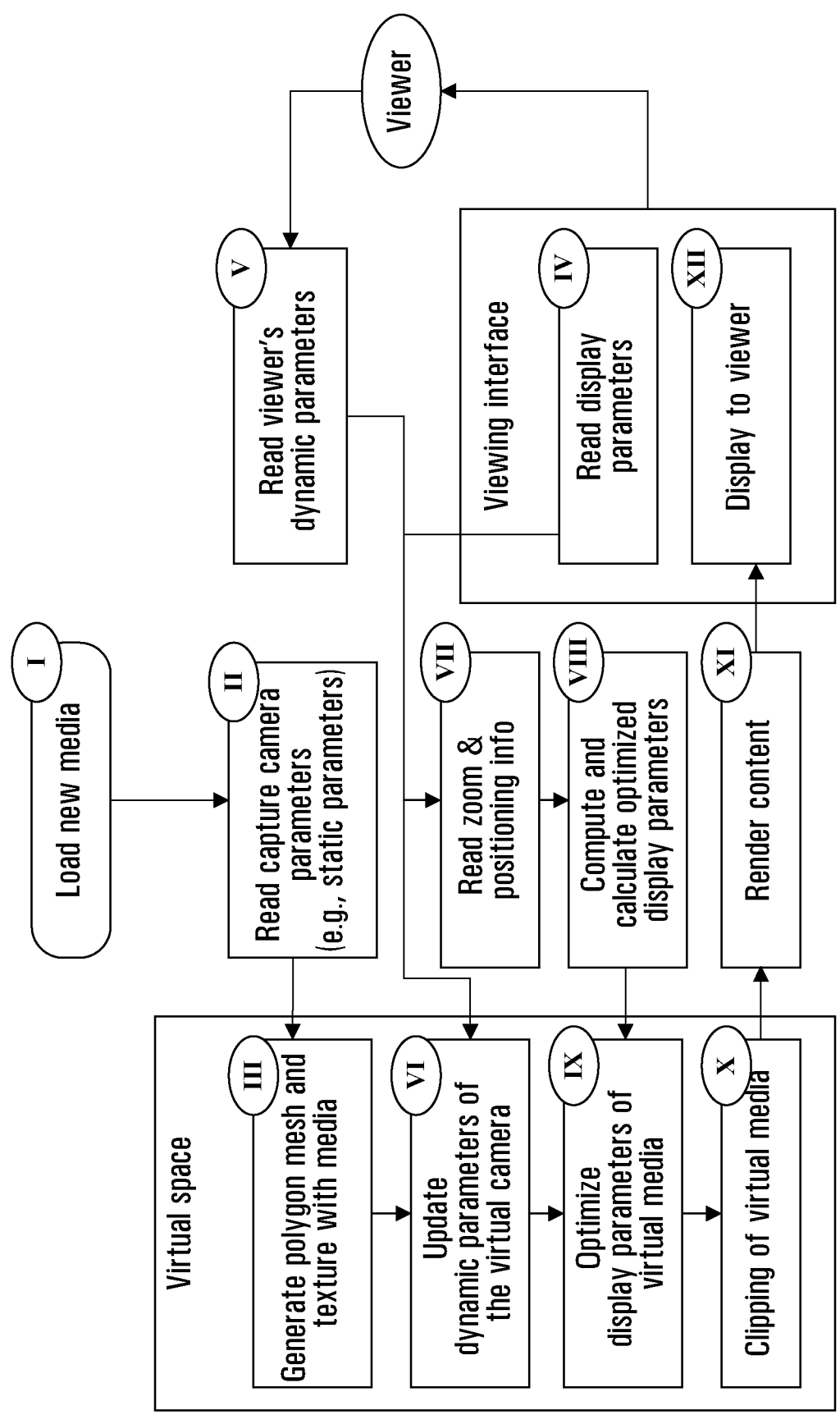
FIG. 5A is a flow chart of an exemplary method for processing the dynamic parameters that can be considered to adjust the stereoscopic images to be viewed on a display.

FIG. 5A presents an exemplary flow chart of a method to process variables and inputs according to the viewer's dynamic parameters V and the capture camera parameters II (e.g., the static parameters of the capture cameras) in order to generate and display stereoscopic images to the viewer XII. These dynamic parameters V can be treated as variable inputs considered at various steps. The step III of positioning and generating the polygon mesh in the virtual environment can be done using the capture camera's parameters II: lens type, aspect ratio, projection type (equirectangular, spherical, plane, etc.), media name, horizontal field of view, vertical field of view, toe-in, relative position of the left and right cameras, etc. It will be appreciated that the capture cameras can have their own specific parameters, meaning that they do not have to be the similar cameras as long as they share a common portion of their field of view. In some embodiments, all of the parameters (display parameters and parameters of the viewer) can be acquired simultaneously. In some embodiments, the display parameters IV (aspect ratio, stereoscopic rendition mode, etc.) may be used to adjust some of the virtual camera's parameters (e.g., view frustum) in step VI, while some of its dynamic parameters can be adjusted with some of the dynamic parameters of the viewer V (interocular distance, eye to display screen distance, etc.). Some of the dynamic parameters of the viewer V (e.g., zoom in, shift) can also be used to implement a zoom factor (increase/decrease of the view frustum), shift or change of orientation of the virtual camera's view frustum following the steps VII, VIII and IX. In some embodiments, additional processing may be added, such as methods and parameters not unlike the ones disclosed in the U.S. Pat. No. 10,917, 623,B2, implemented within step VIII.

In some embodiments, the left and right images may be processed simultaneously (each with its own graphics processing unit partition and texture for example) and the values of dynamic parameters can be updated every frame, in other embodiments the dynamic parameters update frequency can be adjusted (lowered or increased).

It will be appreciated that the method can be used to produce various modes of stereoscopic display modes as needed, such as autostereoscopic, anaglyphic, line interleaved, column interleaved and more. The method for rendition may be open to any color encoding and may vary depending on the device. For example, with an autostereoscopic device, the final shader would depend on the display device and could be provided by the device manufacturer or could require information about the stereoscopic display's specifications to properly map the rendered images to provide optimal results.

In some embodiments, during the clipping step X for example, the selected region of the left virtual camera can be compared to the selected region of the right virtual camera in order to leave out of the rendering process (leave blank/darken) the pixel corresponding to the section of the selected regions that are outside of the common area initially captured. In some embodiments, in the case where this may generate stereoscopic images that can be smaller than the intended display screen(s), a border can be provided to those images before being displayed to ensure that they fill the stereoscopic display(s).

Figure 5B:
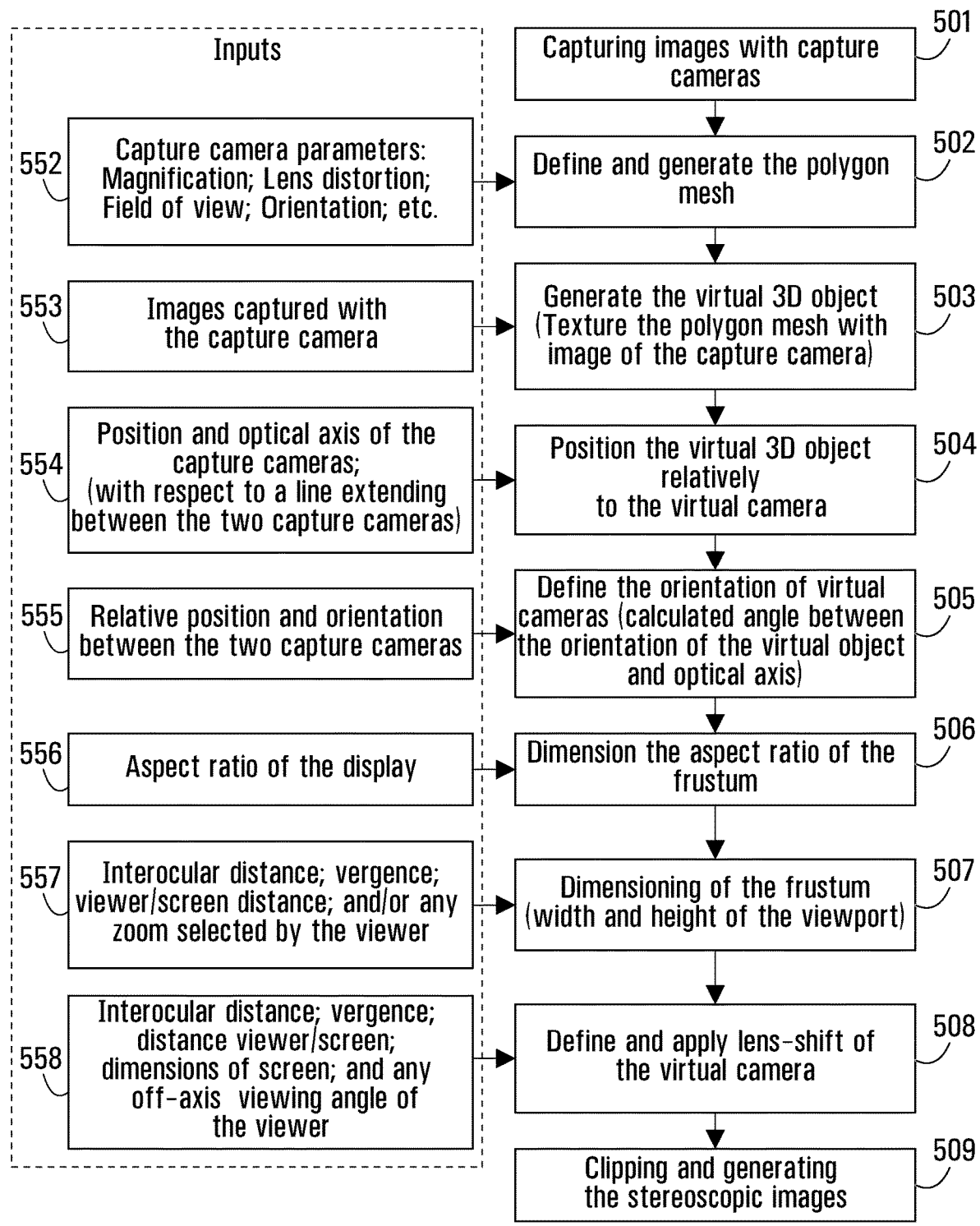
FIG. 5B is a block diagram presenting the inputs of the method of some embodiments and some of their respective purpose.

FIG. 5B presents a block diagram of the inputs and parameters, which can include the parameters mentioned in FIG. 5A, used to setup the elements of the virtual environment (mesh, texture, 3D objects, view frustum, positions and orientation of the virtual camera, etc.), which is encompassing and summarizing the previously described relations between the inputs and the steps of the method of some embodiments.

In some of the embodiment, some of the following steps can be used to use the proposed method: a step 501 of capturing images with capture cameras having a common portion of their FOV; a step 502 of defining and generating the polygon mesh/meshes that may require the use of the capture camera/cameras parameters 552; a step 503 of generating the virtual 3D object (e.g., texturing the polygon mesh with image of the capture camera) that may require the use of images captured with the capture camera 553; a step 504 of positioning the virtual 3D object relatively to the virtual camera that may require the use of the position and orientation of the optical axis of the capture cameras with respect to a line extending between the two capture cameras 554; a step 505 of defining the orientation of virtual cameras (e.g., calculating the angle between the orientation of the virtual object and optical axis) that may require the use of various parameters 555 (e.g., the relative position and orientation between the two capture cameras); a step 506 of dimensioning the aspect ratio of the frustum that may require the use of the aspect ratio of the display 556; a step 507 of dimensioning of the frustum (e.g., the width and the height of the viewport) that may require the use of various parameters 557 (e.g., the interocular distance; the vergence; the viewer-to-screen distance; and/or any zoom selected by the viewer); a step 508 of defining and applying a lens-shift of the virtual camera that may require the use of various parameters 558 (e.g., the interocular distance; the vergence; the distance viewer-to-screen; the dimensions of the screen; and/or any of the off-axis viewing angle of the viewer); and a step 509 of formatting (e.g., clipping) and generating (e.g., rendering) the stereoscopic images for stereoscopic display to the viewer.

Figure 6:
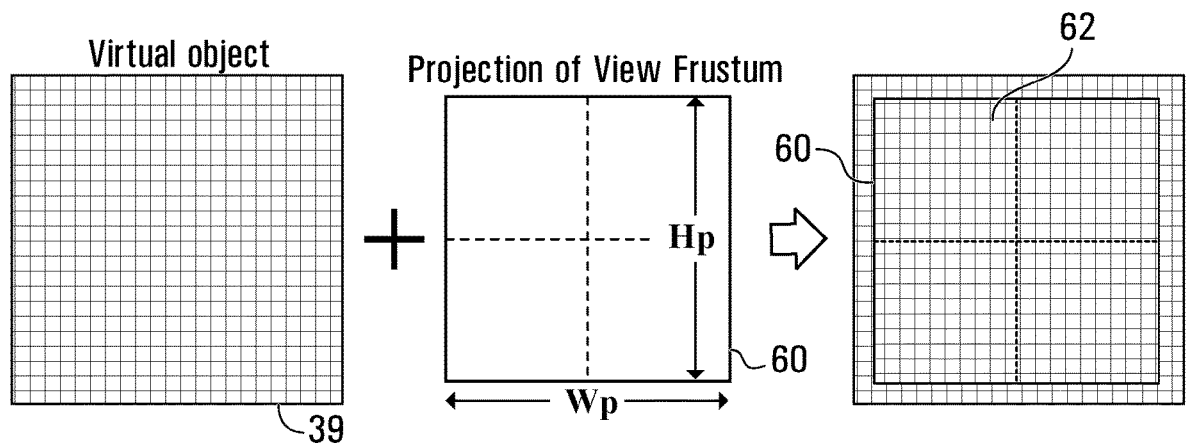
FIG. 6 is a diagram of the viewing frustum used to select the recaptured image out of the virtual object to generate the final image to be used for projecting to the viewer.

FIG. 6 also shows an example of a recaptured image 62 corresponding to a selected region of a virtual object 39 within the projection of the view frustum 60, also referred to as the viewport of a virtual camera. In some embodiments, the projection of the view frustum 60 may be defined as the shape or region corresponding to the projection of the view frustum (field of view or cone of vision of a virtual camera) onto a given virtual object 39. In the exemplary embodiment illustrated in FIG. 6, the projection of the view frustum 60 can be a rectangle having an aspect ratio that can the same as the aspect ratio of the display screen having a width (Ws) and a height (Hs), where the width (Wp) and height (Hp) of the projection of the view frustum can have a value corresponding to the multiplication of the corresponding dimension of the display screen (Ws or Hs) with a scale factor (SF) between the real and virtual worlds. This recaptured image 62 can be used to execute the clipping (selectively enable or disable rendering operations of pixels within a defined region of interest) of the virtual media before rendering, so that only the pixels of the recaptured image 62 corresponding to the selected region (within the view frustum 44) of the left and right virtual object 39 can be rendered to optimized GPU resources. In some embodiments, the resolution of the recaptured image within the viewport (projection of the view frustum) to be rendered can be selected to be of a chosen screen resolution so that a right number of pixels (subdivisions of the rendered image) can be rendered by the GPU.

In some embodiments, the screen resolution can be selected by the viewer to be maximum resolution or a minimum resolution or both. Resolution may vary and can include but are not limited to values such as standard definition (480p) having 640×480 pixels, high definition (720p) having 1280×7200 pixels, full high definition (1080p) having 1920×1080 pixels, or others.

Figure 7:
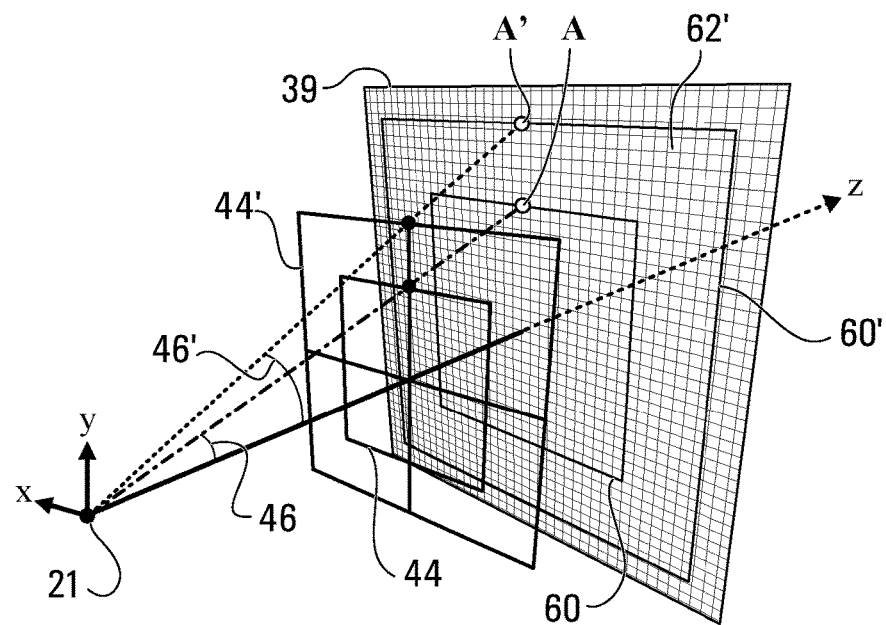
FIG. 7 is a three-dimensional diagram illustrating the effect of adjusting or changing the viewing frustum on the selected region of the virtual object and thus on the final image to be displayed to the viewer.

FIG. 7 shows a 3D schematic illustration of some of the change induced on a view frustum that can be associated to a view transformation similar or analog to the one previously presented in FIG. 4A. In exemplary embodiment of FIG. 7, the view transformation can comprise increasing the angular height 46, also referred to as the vertical of the field of view, of the frustum to another modified angular height 46' while maintaining its aspect ratio therefore the initial projection of the view frustum 60 corresponding to the initial view frustum 44 can be enlarged to the projection of the modified view frustum 60' corresponding to the modified view frustum 44' in this embodiment. Such a view transformation can thus modify the output image recaptured with the virtual cameras, here displayed as the adjusted final image 62'.

A person skilled in the art will appreciate that the parameters influencing the view frustum are not limited to the specifications described in this embodiment and various parameters can be added to the process as needed.

In these embodiments, it may be possible to arrange with the chosen technique the pairs of rectified left and right images to produce a better stereoscopic display for the viewer. Since the virtual cameras $21_{L,R}$ must always be parallel to one another, the chosen technique may be similar, but not limited to the viewer-adjusted stereoscopic image display method described in the U.S. Pat. No. 10,917,623B2 patent and can utilize one or a combination of simple operations such as cropping, scaling, translation, rotation or others. In some embodiments, the images can be, for example, not unlike in this patent reference, in the case of stereoscopic content, an impression of depth can be given by using a parallax difference that can often conflict with other visual cues. One of the principal issues can come from the difference between two important information; ocular convergence of the eyes (yaw orientation between the left and right eyes) and the distance to which the eyes focus (e.g., the distance between the display screen and the eyes of the viewer) referred to as ocular accommodation. It will be appreciated that someone skilled in the art can calculate the ocular convergence using the interocular distance (Io) of the viewer and his distance to the display screen (Ds).

The brain regularly updates these two pieces of information while taking them into considerations and comparing them to one another to allow for a clear vision and for better interpretation of the visual information. While in the real world, the brain is used to a certain learned correspondence between the convergence and ocular accommodation (e.g., if one varies the other information varies a certain way), in some embodiments, these two pieces of information can be in conflict (inconsistent) with this correspondence, for example, the eyes of the viewer can remain focused on the display screen while the convergence may vary. Someone skilled in the art knows that in the cases where the conflict between convergence and ocular accommodation many adverse effects may occur such as some loss of depth perception or discomfort, pain and diplopia, for example. To accommodate and manage this issue a maximum or farthest distance (perceived "inside" the screen) and a minimum or closest distance ("out" of the screen) respecting the angular constraint can be determined as described in the patent reference above. In fact, to allow the viewer's perception of depth to accommodate to such a difference between convergence information these maximum (Df) and minimum (Dc) distances were determined in this U.S. Pat. No. 10,917,623B2 patent and can be expressed as a function of an optical base (Bo).

In some embodiments, the stereoscopic images may be further scaled and/or positioned using a relative base offset to make the most distant objects appear closer to the screen and/or to make the closest objects appear closer to the single or multiple screens. Such a further scaling and/or positioning, while reducing a possible eye strain due to a difference in ocular accommodation for focusing on the single or multiple screens and ocular accommodation for focusing on close and/or far objects, can be used to maintain objects appearing at a given depth to appear at about a same depth. In some embodiments, the clipping process can be used to control a maximum and/or a minimum distance and allow for vergence-accommodation.

In some embodiments, the stereoscopic zoom, which implies changing the optical base (Bo) defined as the distance between the center of the two images on the screen can be calculated using the interocular distance (Io) of the viewer, a vergence factor (V), which can be an averaged value, and the screen/viewer distance (Ds) with the following equation:

$$Bo = Io - 2Ds \tan\left[\tan^{-1}\left(\frac{Io}{2Ds}\right) - \frac{v}{2}\right] \quad (1)$$

Where the vergence factor is a chosen angular offset (e.g., of about 1 or 2 degrees) of the ocular convergence that can be used to control a maximum angular change required for focusing between objects at a maximum and/or minimum distance, which allow for an ocular convergence/accommodation compensation that can reduce conflicts with some visual cues and therefore give a better stereoscopic experience to the viewer. In some embodiments, the vergence factor can be chosen or fixed to be of a given value. In some embodiments, the vergence factor may be modified or actively adjusted as a function of the screen/viewer distance (Ds). It will be appreciated that in the embodiments where the vergence factor can be negligible and can be approximated to zero (e.g., when Ds is smaller than about 3 meters) the optical base can also have a negligible value (v=0→Bo=0). As previously mentioned, in some embodiments, such an optical base can be used to determine a maximum (Df) or a minimum (Dc) distance of a stereoscopic image with these exemplary relations: Df=Ds/(1−Bo/Io) or Dn=Ds/(Bo/Io+1). In some embodiments, the value of the optical base can be used to control and adjust the width and/or depth (distance) perceived by the viewer, by modifying the view frustum and more specifically the lens-shift. In some embodiments, the dimension of the view frustum (FoV) may be further adjusted to respect the optical base while keeping the same aspect ratio. In some embodiments, a re-dimensioning of the dimensions of the view frustum can be done to adjust the dimensions of the projection of the view frustum onto the virtual object, here referred to as the width (Wp) and the height (Hp) of the projection of the view frustum, which can be calculated using the width (Ws) or the height (Hs) of the display screen and a scale factor (SF) between the real and virtual worlds with the following equation.

$$Wp = Ws \frac{Io}{Bo} SF \quad (2)$$

$$Hp = Hs \frac{Io}{Bo} SF \quad (3)$$

It will be appreciated that the Wp or Hp can also be calculated with the aspect ratio of the screen (Hs/Ws), Hp=Wp·Hs/Ws for example, thus also ensuring that the aspect ratio may be respected. In some embodiments, this re-dimensioning of the view frustum can be completed by means of defining and adjusting an angular width (Wa), also referred to as the horizontal of the field of view, and an angular height (Ha), also referred to as the vertical of the field of view, of the view frustum that, in some embodiments, can be calculated with the following equation.

$$Wa = 2\tan^{-1}\left[\frac{Ws}{2Ds}\frac{Io}{Bo}\right] \quad (4)$$

$$Ha = 2\tan^{-1}\left[\frac{Hs}{2Ds}\frac{Io}{Bo}\right] \quad (5)$$

In some embodiments, the lens-shift can be adjusted to allow a vertical shift of the projection of the view frustum (shift_PF) with the optical base and the width of the display screen (Ws) to better maintain the proportionality of the real world (capture environment) and the virtual environment, such as shift $$\_PF = Bo \cdot Wp / Ws = Bo \cdot SF.$$

Once all the final corrections are implemented, the pair of left and right optimized images generated can then be projected for the viewer's benefit on a chosen display apparatus with the selected technique and technology. In some embodiments, the stereoscopic images may be displayed using separate outputs (one for each eye), for example projectors or the screens of a virtual reality headset.

Figure 8:
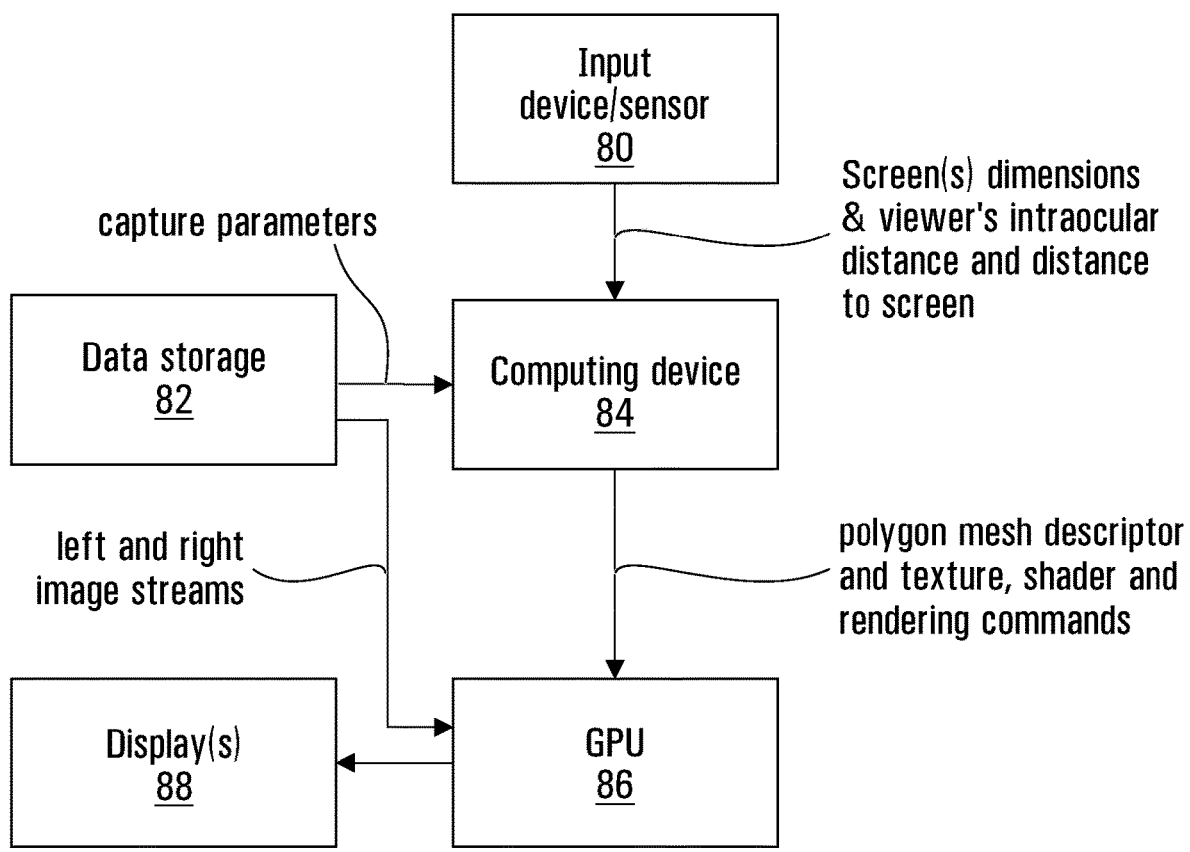
FIG. 8 is a block diagram of the hardware components required to process and execute the presented method for producing stereoscopic display to a viewer.

FIG. 8 present a block diagram of the following hardware electronic components used to process and execute the presented method for producing stereoscopic display to a viewer. It will be appreciated that all the presented components can be interconnected with a circuit, such as a motherboard for example, allowing communication between many of the components of the system. The input data 80 can give information regarding the capture camera's raw images, their respective parameters, the viewer's input parameters and/or other parameters from various captors or sensors (controller/mouse/touch, accelerometer, gyroscope, etc.). The data storage 82 can be used to store multiple information, such as the instructions for executing the presented method; the raw images 24 of a capture camera 20 and its associated parameters; the pre-generated polygon mesh 25 and the parameters of its virtual environment; a stereoscopic video resulting from an embodiment of the method that was previously regenerated and recorded; panoramic images of a scene from two different positions, which may be cropped to extract a selected region; or more. It will be appreciated that the computing device 84 may include a central processing unit (CPU) and a random-access memory (RAM) that can allow for the computing of the required commands. Following the CPU instructions, the graphic processing unit (GPU) 86 can be used to compute and render the stereoscopic images to be displayed to the viewer. The display 88 used to present the stereoscopic images to the viewer can be a wide variety of screens or projector or head-mounted displays or more. It will be appreciated that a program product containing all the instructions for executing the presented method can be saved on a data storage unit that may be an external data storage unit for later processing on an alternative device containing the above-mentioned components.

Figure 9C:
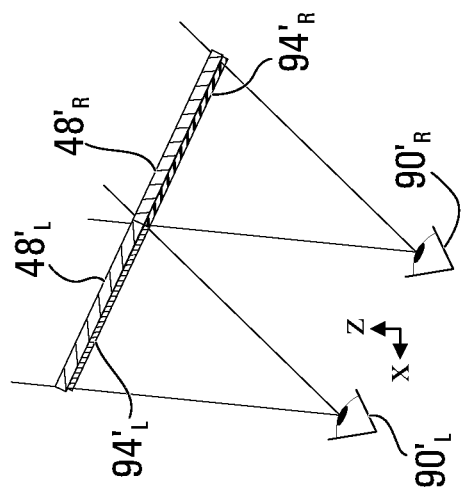
FIG. 9C is an illustration of the top view of stereoscopic images processed to respect the new dynamic parameter's inputs providing the viewer with a view and an optimal depth perception of the new region of interest.
Figure 9B:
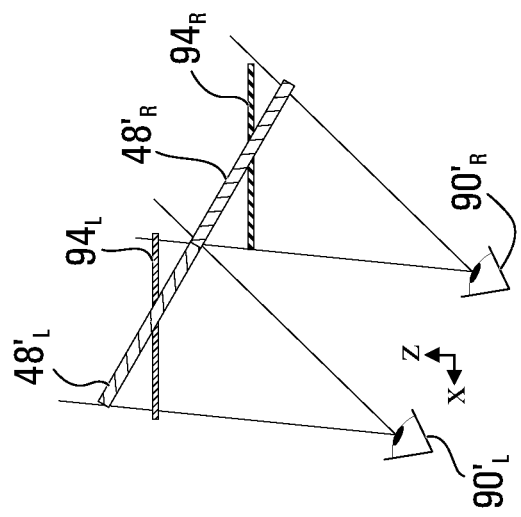
FIG. 9B is an illustration of the top view of images not yet adjusted for the new dynamic parameter's inputs associated with the new orientation of the viewer perspective and the viewer's new region of interest.
Figure 9A:
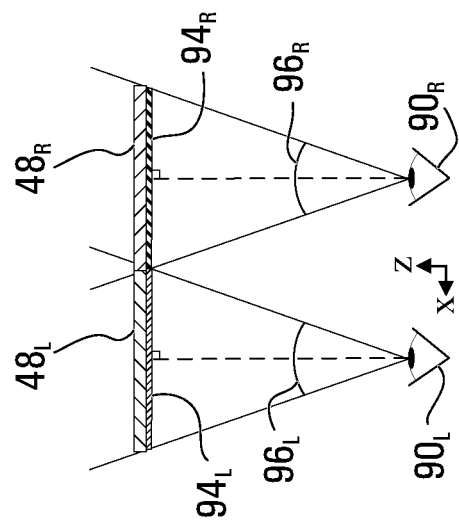
FIG. 9A is an illustration of the top view of a head-mounted stereoscopic apparatus used to display stereoscopic images on the left and right screens of the apparatus and perceived by the left and right eyes of the viewer respectively, for the viewer's initial position.

Some embodiment uses a variety of images taken with various types of capture cameras to process and generate viewer-adjusted stereoscopic images where the viewer's point of view can be dynamic, like in a virtual reality (VR) environment, for example. FIG. 9A presents a schematization of a dynamic head-mounted 3D VR stereoscopic display with two screens (left screen 48L and right screen 48R) or a single screen divided in two such as a smartphone equipped with compatible VR glasses, each presenting the corresponding image (left image 94L and right image 94R) of the pair of processed stereoscopic images for each eye of the viewer (left eye 90L having a corresponding left eye field of view 96L and right eye 90R having a corresponding right eye field of view 96R). FIG. 9B illustrates a transition state between frames where a certain change in the orientation of the VR device (here represented as a clockwise rotation) corresponding to a change in the viewer's region of interest, thus changing the viewer's dynamic parameters (step V of FIG. 5A). In FIG. 9B, the images 94L/94R of the preceding frames can be displayed with the previous dynamic parameters (the same as FIG. 9A) to help visualize the orientation change of the VR device and the parameter changes to be implemented for the following images. FIG. 9C presents the following adjusted stereoscopic images 94'L/94'R corrected to be coherent with the perspective of the new dynamic parameters inputs, processed up to every frame and displayed on the display screens $48'_{L;R}$ for the benefit of the viewer's new point of view $90'_{L;R}$. Note that the viewer's dynamic parameters can be extracted from, but are not limited to a computer's mouse position, an accelerometer and a gyroscope or any type of controller, such as video game controllers, for example.

It will be appreciated that the proposed method can be used with most smartphones equipped with two rear cameras sharing a common portion of their field of view, whatever the camera type or their magnification, to capture raw images to be processed within the smartphone to generate stereoscopic images that can be visualized with its display.

Figure 10B:
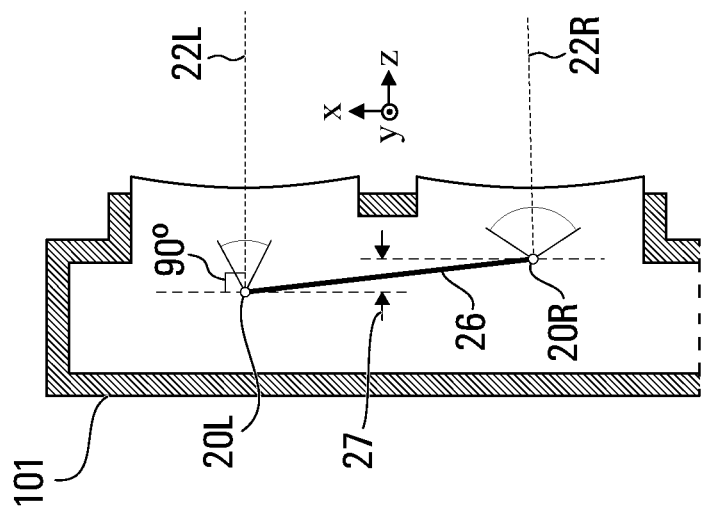
FIG. 10B is a cross-section view of the cutting plane line A-A of FIG. 10A showing the slightly misaligned cameras within its housing.
Figure 10A:
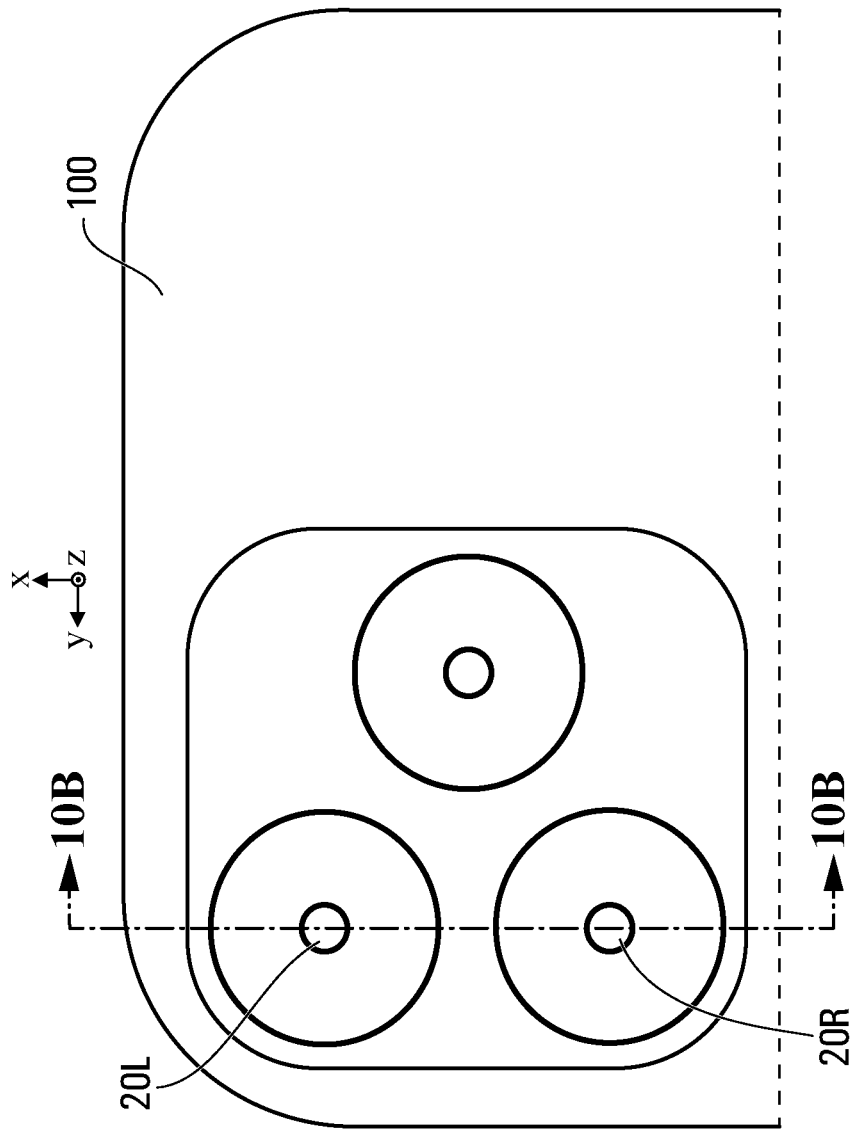
FIG. 10A is an illustration of an embodiment where a smartphone's cameras are slightly misaligned within its housing.

FIG. 10A shows an illustration of the cameras 20 coupled to the rear of a smartphone 100 (e.g., the cameras of the smartphone or an added camera lens that may be clipped on to the smartphone), where a cutting plane line A-A can be seen. FIG. 10B presents the section view A-A on the right side of FIG. 10A allows to see the position of two types of cameras 20L and 20R coupled inside its housing 101. In this embodiment, the cameras can be slightly shifted from one another by a gap 27 that can be considered and corrected with the applicant's method, as similarly previously described for FIGS. 2A, 2H and 2I.

Someone skilled in the art would appreciate that such a gap does not have to be as significant as the gap 27 of this example, since it can be a minor imperfection that may be as small as a few micrometers to affect the viewer's stereoscopic experience. If needed, the proposed method can compensate and correct for such imperfections (e.g., gaps and orientation offsets) between the cameras.

In some embodiments, the orientation (optical axis) of the capture cameras 22 can be parallel, can be almost parallel (i.e., intended to be parallel by design but are actually slightly offsetted from being parallel due, for example, to production tolerances and/or imperfections) or can be non-parallel. If needed, the proposed method can compensate and correct for such offsets between the orientation of the cameras.

The method can also compensate and correct for the difference of magnification between the cameras if needed.

In some embodiments, the stereoscopic images can be displayed on the left and right half of the screen, when the smartphone is held horizontally, and can be observed through or with the help of a set of lenses for visualizing stereoscopic images that may be mounted onto the smartphone, such as Google VR cardboard, for example.

It will be appreciated that the FIG. 10B can also represent a camera assembly/arrangement of any alternative pair of cameras sharing a common portion of capture fields of view integrated into an apparatus to capture images/videos, such as 3D webcams, 3D scanners, 3D cameras or any other such apparatus known in the art.

The proposed method can require or can yield better results by completing a characterization of the capture camera parameters (e.g., position, orientation, field of view, lens distortion/warping) of any of the capture cameras. It will be appreciated that this characterization can be used to adjust or fine-tune the values of the capture camera parameters to be used in the proposed method by characterizing, measuring and/or identifying possible various minor, up to significant, changes and/or imperfections (e.g., position and/or angular offset) between the capture camera parameters of similar apparatuses (e.g., between same camera models and/or camera assembly/arrangement) that would be expected, in theory, to be identical to each other.

It will be appreciated that "defective" 3D products/apparatuses (e.g., 3D webcams comprising an undesired angular and/or position offset of their capture cameras from the desired arrangement that may appear during its production) may not be usable to provide an optimal, or in some cases a functional, stereoscopic experience to the viewer.

The proposed method can be used to enable the use of "defective" products, such as, for example, an apparatus coming out from a production line with camera parameters slightly different from the ones designed and expected. It will be appreciated, therefore, that the proposed method can be used to optimize, correct and or allow the use of various apparatuses (webcams, cameras, scanners, etc.) that may come out of the production lines with imperfects to the capture cameras.

This characterization of the capture camera parameters can be completed, as required by the user, once before using the proposed method for a first time (e.g., once for a new apparatus) up to before completing each new capturing of images (e.g., before taking any new picture) or not at all.

Figure 11:
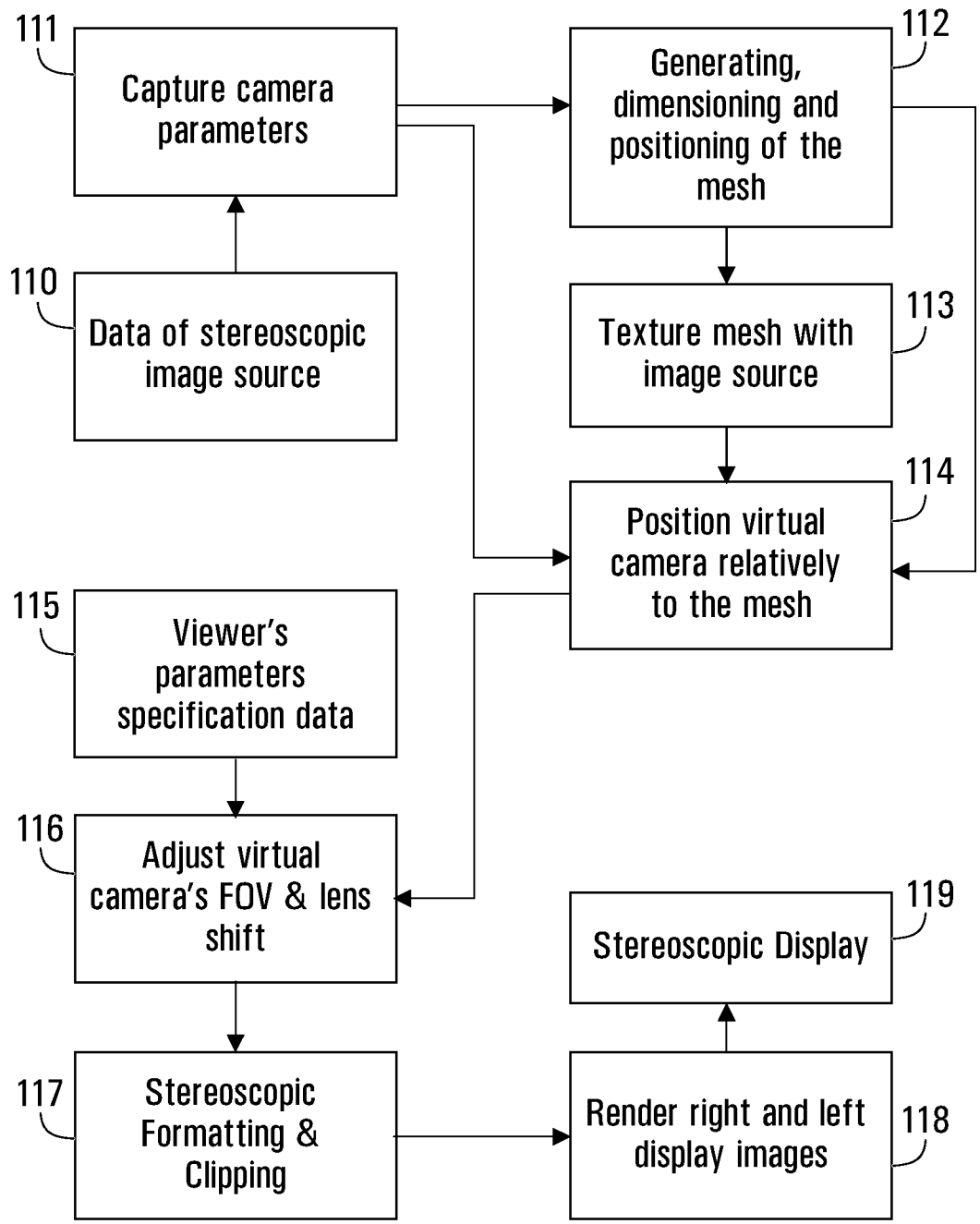
FIG. 11 is a block diagram of some of the main steps of an embodiment of the method for generating stereoscopic images dynamically adjusted to the viewer's parameters.

FIG. 11 presents a block diagram of the main steps of an embodiment of the method, where the image source data 110 can be processed with the viewer's parameters 115 to render stereoscopic images for stereoscopic display 119. In some embodiments, the capture parameters 111 can be used in the steps of generating the polygon mesh 112 that may be done according to the parameter of the capture camera that can be attached with the image source data; texturing of the polygon mesh 113 that can be done with the image source (texture) to obtain a virtual image; and positioning a virtual camera 114 that can be done with respect to the virtual object. The parameters of the virtual camera can be adjusted in step 116 with respect to the display parameters and the viewer's parameters 115. After formatting (e.g., clipping) of the selected region of the virtual object 117, the stereoscopic images with the chosen stereoscopic format can be rendered 118 before being stereoscopically displayed 119.

Figure 12:
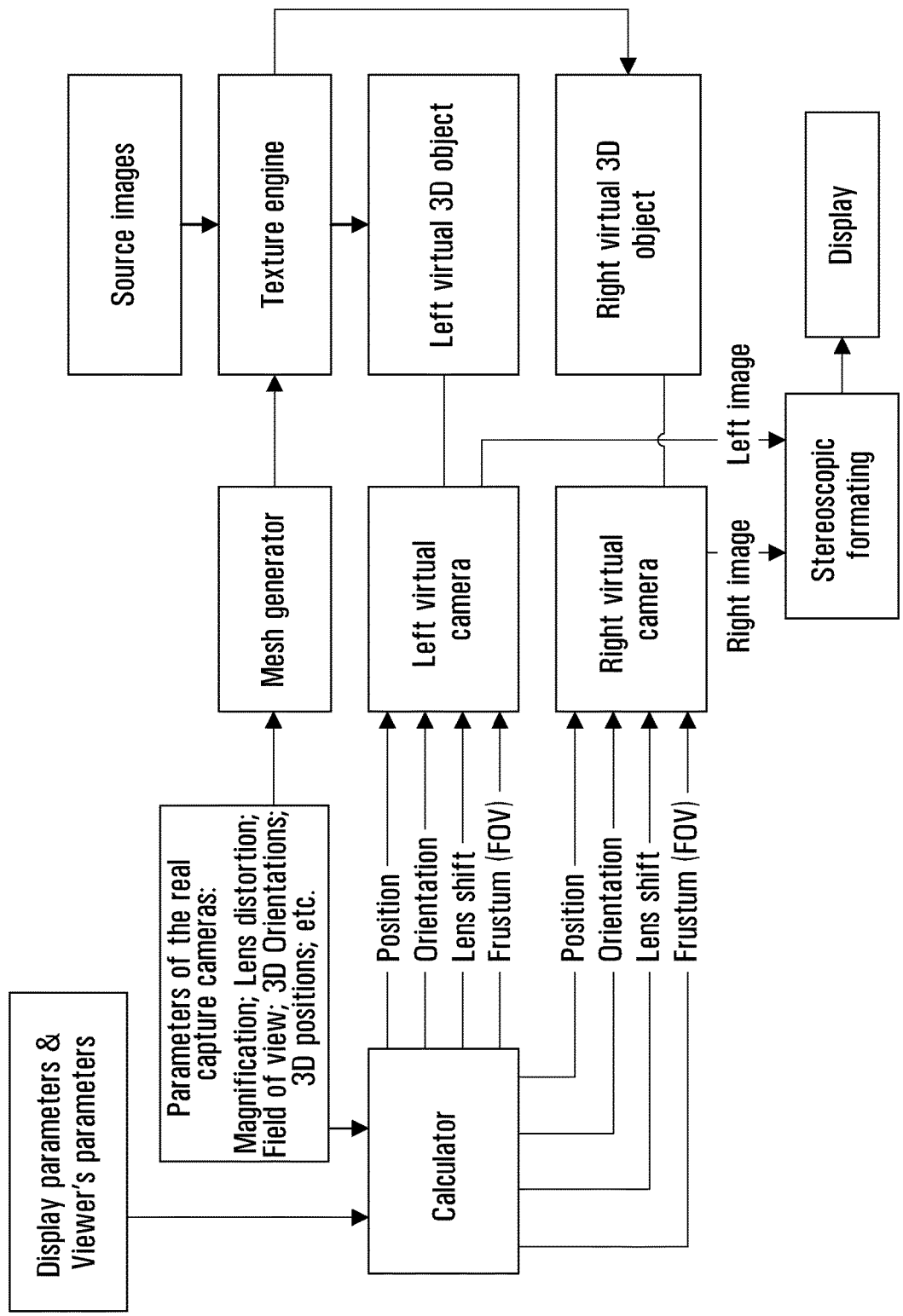
FIG. 12, presents a block diagram of some steps that can be required to ensure that each of the virtual cameras are set in the proper way to ensure that the rendering to the stereoscopic images are functional, optimal and faithful and have a geometric correspondence with the real world.

FIG. 12 presents a block diagram of some steps that can be required to ensure that each of the virtual cameras can be set in the proper way to ensure that the rendering to the stereoscopic images are functional, optimal and faithful and have a geometric correspondence with the real world. Steps may include calculating as previously proposed positions, orientations, lens-shifts, dimension of the frustum (viewport), etc. from various parameters and values that may include various parameters of the capture cameras, various parameters of the display (resolution, aspect ratio, type of stereoscopy and/or number of screens) and various parameters of the viewer (static parameters and/or dynamic parameters).

What is claimed is:

1. A system for processing images for stereoscopic display to a viewer, the images being captured by a left capture camera and a right capture camera having a common portion of capture fields of view, the system comprising:
   at least one processor;
   a non-transitory storage medium operatively connected to the at least one processor, the non-transitory storage medium comprising computer-readable instructions;
   the at least one processor, upon executing the instructions, being configured to:
      generating a left and a right polygon mesh using specifications of said left and said right capture camera having a center axis and defining a position of the virtual camera relative to the mesh so as to correspond to a field of view of the capture camera;
      texturing said left and said right polygon mesh with at least one image from said left and said right capture cameras, respectively to create a left and a right virtual 3D object respectively; and
      rendering a left eye and a right eye image using a left and a right virtual camera directed to capture at least a portion of said left and said right virtual 3D object respectively;
      wherein orientation parameters for said left and said right virtual camera are defined as follows:
         defining, in capture space, a reference line extending between a position of said left capture camera and a position of said right capture camera;
         defining, in capture space, an orientation for said left virtual camera and said right virtual camera to have an orientation parallel to one another and in a selected viewing horizon plane;
         determining left and right orientation offset vectors defining a change between said orientation for said left virtual camera and said right virtual camera and an optical axis orientation of said left capture camera and said right capture camera corresponding to said center axis;
         using said left and said right orientation vectors for orienting, in virtual space, about said center axis said left polygon mesh and said right polygon mesh with respect to said left virtual camera and said right virtual camera, respectively; and
         defining frustum parameters for said left virtual camera and said right virtual camera using display parameters including display dimensions, a distance to a display, an interocular distance and a viewing direction.

2. The system of claim 1, wherein said display parameters include a magnification, wherein said frustum parameters are defined using said magnification.

3. The system of claim 1, wherein said orienting comprises defining a lens shift parameter for said left virtual camera and said right virtual camera.

4. The system of claim 1, wherein said orientation of said optical axis of said left capture camera is coplanar to said orientation of said optical axis of said right capture camera.

5. The system of claim 1, wherein said optical axis of said left capture camera is parallel to said optical axis of said right capture camera, wherein said left capture camera and said right capture camera have different fields of view, and wherein said reference line is non-perpendicular to at least one of said optical axis of said left capture camera and said optical axis of said right capture camera.

6. The system of claim 1, wherein said left eye image and said right eye image comprise one of still images and video images.

7. The system of claim 1, wherein said left eye image and said right eye image are displayed to said viewer on a single screen of said stereoscopic display.

8. The system of claim 1, wherein said left eye image and said right eye image are generated as one of:
   anaglyphic format images;
   column interleaved format images for display on an autostereoscopic display;
   a sequence of page-flip images for viewing with shutter glasses; and
   a sequence of line-interleaved for polarized displays.

9. The system of claim 1, wherein said stereoscopic display comprises a left image display and a right image display, wherein said left eye images are displayed to a left eye of said viewer with said left image display and said right eye images are displayed to a right eye of said viewer with said left image display.

10. The system of claim 1, wherein said viewer comprises a plurality of viewers, and said interocular distance is selected to be a smallest interocular distance among the plurality of viewers.

11. The system of claim 1, wherein a relative orientation between said left capture camera and said right capture camera is one of diverging, parallel and converging.

12. The system of claim 1, wherein said capture fields of view comprise a panoramic image, the at least one processor being further configured for defining a chosen optical axis within a portion of said panoramic image comprised in said common portion of said capture fields of view.

13. A method for processing images for stereoscopic display to a viewer, the images being captured by a left capture camera and a right capture camera having a common portion of capture fields of view, the method being executed by at least one processor, the method comprising:
   generating a left and a right polygon mesh using specifications of said left and said right capture camera having a center axis and defining a position of the virtual camera relative to the mesh so as to correspond to a field of view of the capture camera;
   texturing said left and said right polygon mesh with at least one image from said left and said right capture cameras, respectively to create a left and a right virtual 3D object respectively; and
   rendering a left eye and a right eye image using a left and a right virtual camera directed to capture at least a portion of said left and said right virtual 3D object respectively;
   wherein orientation parameters for said left and said right virtual camera are defined as follows:
      defining, in capture space, a reference line extending between a position of said left capture camera and a position of said right capture camera;
      defining, in capture space, an orientation for said left virtual camera and said right virtual camera to have an orientation parallel to one another and in a selected viewing horizon plane;
      determining left and right orientation offset vectors defining a change between said orientation for said left virtual camera and said right virtual camera and an optical axis orientation of said left capture camera and said right capture camera corresponding to said center axis;

using said left and said right orientation vectors for orienting, in virtual space, about said center axis said left polygon mesh and said right polygon mesh with respect to said left virtual camera and said right virtual camera, respectively; and defining frustum parameters for said left virtual camera and said right virtual camera using display parameters including display dimensions, a distance to a display, an interocular distance and a viewing direction.

14. The method of claim 13, wherein said display parameters include a magnification, wherein said frustum parameters are defined using said magnification.

15. The method of claim 13, wherein said orienting comprises defining a lens shift parameter for said left virtual camera and said right virtual camera.

16. The method of claim 13, wherein said orientation of said optical axis of said left capture camera is coplanar to said orientation of said optical axis of said right capture camera.

17. The method of claim 13, wherein said optical axis of said left capture camera is parallel to said optical axis of said right capture camera, wherein said left capture camera and said right capture camera have different fields of view, and wherein said reference line is non-perpendicular to at least one of said optical axis of said left capture camera and said optical axis of said right capture camera.

18. The method of claim 13, wherein said left eye image and said right eye image comprise one of still images and video images.

19. The method of claim 13, wherein said left eye image and said right eye image are displayed to said viewer on a single screen of said stereoscopic display.

20. The method of claim 13, wherein said left eye image and said right eye image are generated as one of:
   anaglyphic format images;
   column interleaved format images for display on an autostereoscopic display;
   a sequence of page-flip images for viewing with shutter glasses; and
   a sequence of line-interleaved for polarized displays.

21. The method of claim 13, wherein said stereoscopic display comprises a left image display and a right image display, wherein said left eye images are displayed to a left eye of said viewer with said left image display and said right eye images are displayed to a right eye of said viewer with said left image display.

22. A computer program product comprising a non-transitory memory storing instructions for a processor for performing the method of claim 13.

* * * * *